United States Patent [19]
Glasser et al.

[11] Patent Number: 5,764,890
[45] Date of Patent: Jun. 9, 1998

[54] METHOD AND SYSTEM FOR ADDING A SECURE NETWORK SERVER TO AN EXISTING COMPUTER NETWORK

[75] Inventors: Daniel S. Glasser; Thomas R. Reardon, both of Seattle; Aaron W. Ogus, Kirkland; Samuel J. McKelvie, Bellevue; George Joy, Redmond, all of Wash.

[73] Assignee: Microsoft Corporation, Redmond, Wash.

[21] Appl. No.: 899,382

[22] Filed: Jul. 23, 1997

Related U.S. Application Data

[63] Continuation of Ser. No. 354,628, Dec. 13, 1994, abandoned.

[51] Int. Cl.⁶ .................................................. G06F 11/00
[52] U.S. Cl. ................. 395/188.01; 380/25; 364/222.5; 364/286.4
[58] Field of Search ................. 395/186, 187.01, 395/188.01; 380/3, 4, 23, 25; 364/222.5, 260.81, 286.4, 286.5; 340/825.31, 825.32

[56] References Cited

U.S. PATENT DOCUMENTS

| | | | |
|---|---|---|---|
| 4,924,378 | 5/1990 | Hershey | 395/187.01 |
| 5,235,642 | 8/1993 | Wobber et al. | 380/25 |
| 5,241,594 | 8/1993 | Kung | 380/4 |
| 5,329,619 | 7/1994 | Page | 395/200 |
| 5,349,643 | 9/1994 | Cox | 380/25 |
| 5,455,953 | 10/1995 | Russell | 395/187.01 X |
| 5,475,625 | 12/1995 | Glaschick | 395/187.01 X |
| 5,481,720 | 1/1996 | Loucks | 395/700 |
| 5,506,961 | 4/1996 | Carlson | 395/186 |
| 5,560,008 | 9/1996 | Johnson et al. | 395/650 |
| 5,586,260 | 12/1996 | Hu | 395/200.2 |

OTHER PUBLICATIONS

Deswarte et al., "Intrusion Tolerance in Distributed Computing Systems", 1991 IEEE Symposium on Security and Privacy, pp. 110-121.

Gong, "Increasing Availability and Security of an Authentication Service", IEEE Journal on Selected Areas in Communications, vol. 11 No. 5, Jun. 1993, pp. 657–662.

Szczerbina, Pawel, Novell's NetWare Core Protocol, Dr. Dobb's Journal, Nov. 1993, pp. 123–132.

Novell, Incorporated, IPX Router Specification, Version 1.10, Nov. 17, 1992.

Nance, Barry, Automatic NetWare Log–Ins, Byte, vol. 18, No. 3, p. 216 et seq., Mar. 1993.

Lamb, Jason, Securing NetWare; NetWare Security Management; Tutorial, LAN Magazine, vol. 8, No. 11, p. 91 et seq., Oct. 1993.

Gibbs, Mark, Delving Inside Novell's NetWare Directory Services; Promising Technology Takes Some Getting Used To, Network World, p. 32 et seq., May 2, 1994.

Day, Michael, Network Directory Services: Major Technology Behind 4.0, LAN Times, vol. 10, Issue 9, p. 60 et seq., May 10, 1993.

*Primary Examiner*—Robert W. Beausoliel, Jr.
*Assistant Examiner*—Dieu-Minh Le
*Attorney, Agent, or Firm*—Leydig, Voit & Mayer, Ltd.

[57] ABSTRACT

A method and system for adding a secured network server to an existing network for access by a client thereof, wherein the added server does not possess a database of authentication credentials. The client is first authenticated for access to the added server by passing authentication requests received from the client to an authenticating agent having a database of authentication credentials, which may include information from a bindery comprising users, groups and passwords. The responses from the authenticating agent are then evaluated, and if the response indicates validity, the client is the granted access to the added server. Database services are provided to the authenticated client by first evaluating database requests received from the client. Requests seeking information maintained by the authenticating agent are handled by passing the requests to the authenticating agent and using its response to reply to the client.

14 Claims, 18 Drawing Sheets

Allocate slot request:
(create service connection)

| Bytes 0-1 | 1111h | — 301 |
|---|---|---|
| Byte 2 | 00h | — 302 |
| Byte 3 | FFh | — 303 |
| Byte 4 | 00h | — 304 |
| Byte 5 | FFh | — 305 |
| Byte 6 | 00h | — 306 |

Request ↖300

FIG. 7A

| Bytes 0-1 | 3333h | — 311 |
|---|---|---|
| Byte 2 | 00h | — 312 |
| Byte 3 | 48h | — 313 |
| Byte 4 | 00h | — 314 |
| Byte 5 | 00h | — 315 |
| Byte 6 | 00h | — 316 |
| Byte 7 | 00h | — 317 |

Response ↖310

FIG. 7B

Negotiate Buffer:

| Bytes 0-1 | 2222h | — 321 |
|---|---|---|
| Byte 2 | 01h | — 322 |
| Byte 3 | 48h | — 323 |
| Byte 4 | 00h | — 324 |
| Byte 5 | 00h | — 325 |
| Byte 6 | 21h | — 326 |
| Byte 7-8 | 200h | — 327 |

Request ↖320

FIG. 7C

| Bytes 0-1 | 3333h | — 331 |
|---|---|---|
| Byte 2 | 01h | — 332 |
| Byte 3 | 48h | — 333 |
| Byte 4 | 00h | — 334 |
| Byte 5 | 00h | — 335 |
| Byte 6 | 00h | — 336 |
| Byte 7 | 00h | — 337 |
| Bytes 8-9 | 400h | — 338 |

Response ↖330

FIG. 7D

Logout:
(client to server)

| Bytes 0-1 | 2222h | — 351 |
|---|---|---|
| Byte 2 | 02h | — 352 |
| Byte 3 | 05h | — 353 |
| Byte 4 | 00h | — 354 |
| Byte 5 | 00h | — 355 |
| Byte 6 | 19h | — 356 |

Request 350

FIG. 8A

Get Bindery Object ID:
(client to server)

| Bytes 0-1 | 2222h | — 359 |
|---|---|---|
| Byte 2 | 03h | — 360 |
| Byte 3 | 05h | — 361 |
| Byte 4 | 00h | — 362 |
| Byte 5 | 00h | — 363 |
| Byte 6 | 17h | — 364 |
| Bytes 7-8 | 0007h | — 365 |
| Bytes 9 | 35h | — 366 |
| Bytes 10-11 | 01h | — 367 |
| Byte 12 | 03h | — 368 |
| Bytes 13-15 | JOE | — 369 |

Request 358

FIG. 8B

Get Bindery Object ID:
(server to authenticating agent))

| Bytes 0-1 | 2222h | — 379 |
|---|---|---|
| Byte 2 | 02h | — 380 |
| Byte 3 | 48h | — 381 |
| Byte 4 | 00h | — 382 |
| Byte 5 | 00h | — 383 |
| Byte 6 | 17h | — 384 |
| Bytes 7-8 | 0007h | — 385 |
| Bytes 9 | 35h | — 386 |
| Bytes 10-11 | 01h | — 387 |
| Byte 12 | 03h | — 388 |
| Bytes 13-15 | JOE | — 389 |

Request ↖ 378

FIG. 8C

Get Bindery Object ID:
(authenticating agent to server)

| Bytes 0-1 | 3333h | — 391 |
|---|---|---|
| Byte 2 | 02h | — 392 |
| Byte 3 | 48h | — 393 |
| Byte 4 | 00h | — 394 |
| Byte 5 | 00h | — 395 |
| Byte 6 | 00h | — 396 |
| Byte 7 | 00h | — 397 |
| Bytes 8-11 | 0033AA88h | — 398 |

Response ↖ 390

FIG. 8D

Get Bindery Object ID:
(server to client)

| Bytes 0-1 | 3333h | — 401 |
|---|---|---|
| Byte 2 | 03h | — 402 |
| Byte 3 | 05h | — 403 |
| Byte 4 | 00h | — 404 |
| Byte 5 | 00h | — 405 |
| Byte 6 | 00h | — 406 |
| Byte 7 | 00h | — 407 |
| Bytes 8-11 | 0033AA88h | — 408 |

Response ↖ 400

FIG. 8E

Get Encryption Key:
(client to server)

| Bytes 0-1 | 2222h | — 411 |
|---|---|---|
| Byte 2 | 04h | — 412 |
| Byte 3 | 05h | — 413 |
| Byte 4 | 00h | — 414 |
| Byte 5 | 00h | — 415 |
| Byte 6 | 17h | — 416 |
| Bytes 7-8 | 0001h | — 417 |
| Byte 9 | 17h | — 419 |

Request ↑ 410

FIG. 8F

Get Encryption Key:
(server to authenticating agent)

| Bytes 0-1 | 2222h | — 431 |
|---|---|---|
| Byte 2 | 03h | — 432 |
| Byte 3 | 48h | — 433 |
| Byte 4 | 00h | — 434 |
| Byte 5 | 00h | — 435 |
| Byte 6 | 17h | — 436 |
| Bytes 7-8 | 0001h | — 437 |
| Byte 9 | 17h | — 439 |

Request ↑ 430

FIG. 8G

Get Encryption Key:
(authenticating agent to server)

| Bytes 0-1 | 3333h | — 441 |
|---|---|---|
| Byte 2 | 03h | — 442 |
| Byte 3 | 48h | — 443 |
| Byte 4 | 00h | — 444 |
| Byte 5 | 00h | — 445 |
| Byte 6 | 00h | — 446 |
| Byte 7 | 00h | — 447 |
| Bytes 8-17 | ENCRYPT_KEY | — 448 |

Response ↑ 440

FIG. 8H

Get Encryption Key:
(server to client)

| Bytes 0-1 | 3333h |
|---|---|
| Byte 2 | 04h |
| Byte 3 | 05h |
| Byte 4 | 00h |
| Byte 5 | 00h |
| Byte 6 | 00h |
| Byte 7 | 00h |
| Bytes 8-17 | ENCRYP_KEY |

— 451
— 452
— 453
— 454
— 455
— 456
— 457
— 458

Response
450

FIG. 8I

Login Object Encrypted
(client to server):

| Bytes 0-1 | 2222h |
|---|---|
| Byte 2 | 05h |
| Byte 3 | 05h |
| Byte 4 | 00h |
| Byte 5 | 00h |
| Byte 6 | 17h |
| Bytes 7-8 | 000Fh |
| Byte 9 | 18h |
| Bytes 10-17 | #ENCRYPTED_PW |
| Byte 18-19 | 01h |
| Byte 20 | 03H |
| Bytes 21-23 | JOE |

— 461
— 462
— 463
— 464
— 465
— 466
— 467
— 468
— 469
— 470
— 471
— 472

Request
460

FIG. 8J

Verify Bindery Object Password Encrypted: (server to authenticating agent)

| Bytes 0-1 | 2222h |
|---|---|
| Byte 2 | 04h |
| Byte 3 | 48h |
| Byte 4 | 00h |
| Byte 5 | 00h — 475 |
| Byte 6 | 17h — 476 |
| Bytes 7-8 | 0000Fh — 477 |
| Bytes 9 | 4Ah — 478 |
| Bytes 10-17 | #ENCRYPTED_PW — 479 |
| Bytes 18-19 | 01h — 480 |
| Byte 20 | 03h — 481 |
| Bytes 21-23 | JOE — 482 |

Request ⎯474

FIG. 8K

Verify Bindery Object Password Encrypted: (authenticating agent to server)

| Bytes 0-1 | 3333h |
|---|---|
| Byte 2 | 04h |
| Byte 3 | 48h |
| Byte 4 | 00h |
| Byte 5 | 00h — 485 |
| Byte 6 | 00h — 486 |
| Byte 7 | 00h — 487 |

Response ⎯484

FIG. 8L

Login User Object Encrypted (server to client):

| Bytes 0-1 | 3333h — 491 |
|---|---|
| Byte 2 | 05h — 492 |
| Byte 3 | 05h — 493 |
| Byte 4 | 00h — 494 |
| Byte 5 | 00h — 495 |
| Byte 6 | 00h — 496 |
| Byte 7 | 00h — 497 |

Response ⎯490

FIG. 8M

METHOD AND SYSTEM FOR ADDING A SECURE NETWORK SERVER TO AN EXISTING COMPUTER NETWORK

This is a continuation of application Ser. No. 08/354,628 filed on Dec. 13, 1994, now abandoned.

FIELD OF THE INVENTION

The present invention relates generally to computer networks, and more particularly to a method and system for adding a server to an existing computer network.

BACKGROUND OF THE INVENTION

Networks of interconnected computer-based devices frequently need to increase in capacity in order to accommodate increasing user requirements. This may be accomplished by adding various devices to the network. It is generally desirable to secure these devices to prevent unauthorized users from accessing the services offered thereby.

As a result, a security system is often provided in such networks. For example, a device such as a network file server in a local area network (LAN) may be arranged to restrict unauthorized entities on the network from accessing file-sharing services. Other types of services that are typically restricted include printer-sharing, CPU-sharing (such as in a remote procedure call, or RPC), backup services and connectivity services (such as accessing a remote network through a modem).

Such servers—which may also include database servers, communication servers, gateway servers and management servers—typically restrict user access in two ways. The first way is by performing a task commonly known as "authentication," which requires checking a set of credentials or the like provided by the potential user against a known set of values corresponding thereto in order to ensure that the user requesting access is indeed authorized to login to the server.

A common way of providing authentication is for a remote client to initiate a login procedure by providing a valid identification code (Login ID) and by requesting a challenge key from the network server. The server responds by providing such a challenge key, which the client then combines with an appropriate password entered by the user and returns an encrypted combination code to the server for verification. Encryption techniques are employed when combining the password with the challenge key so that other entities connected to the network are unable to derive the password by monitoring the data transmissions between the user and the server.

Verification is performed by the server, which references an internal database of authentication information including the user's password (stored in encrypted form) to similarly calculate the expected encrypted combination code. If the combination code received by the server matches the code calculated by the server, and other restrictions (such as login hours) are satisfied, the client is admitted to the system. In this manner, only users in possession of a correct password are allowed to login to the server.

Provided that the initial login access is granted, i.e., a valid user entered a valid password, the second way of restricting a user's access is by performing a task called "access control." In general, access control is performed by the server referencing a database of rights for an authenticated user to determine the level of access the user has to the various services provided by the server. In this manner the user is permitted access to certain services of the server but is denied access to other services which overstep the user's rights.

By way of example, some users are allowed access to certain files of the server, but are denied access to other files—those files are restricted as far as that user is concerned. When a request to perform some action on a file is received from such a user, the server references the rights database to determine if the user has the right to access that file. Access control thus ensures that only users having rights to the file are permitted access to it. Accordingly, requests entered by a user improperly attempting to access the file are denied.

Access rights are typically organized by groups of users, and thus such secured devices also maintain a list of groups that the user belongs to. The list of valid users, their associated passwords, group information and other related detailed information is maintained in a database on the server, sometimes referred to as the bindery.

While this security system works reasonably well with client workstations seeking access to a single secured network server, problems arise in more complex networking arrangements which comprise multiple networks or multiple servers to which a client workstation might connect. The user typically is not concerned with the details of the authentication process, only that access is granted when properly requested.

As a result, it is preferable that the user be able to access all available devices on a network with a single set of credentials, so that the user does not have to remember more than one such set, or be concerned with which server is handling which request. In other words, it is beneficial if a user can login to each device in the network in the same manner, without regards to any particular device attached thereto, by entering the same Login ID name and password.

To institute a security system in a network having multiple secured servers wherein the servers commonly recognize a single set of credentials, it is currently necessary to maintain multiple copies of the authentication database, one copy at each network server connected on the network. Numerous networking arrangements use this method to maintain security while enabling the user to possess a single set of credentials.

However, administering several of these authentication databases requires considerable multiplicative efforts and timing considerations to keep them consistent as changes occur. For example, a change made to the authentication database of any one server, such as when a user changes a password, must be made on all servers so that the user retains the ability to access any of the servers with the same password.

In addition to occupying otherwise available transmission times on the network data communications path, updating and transmitting copies of the authentication database to multiple locations may compromise security, as the greater the number of devices that maintain such an identical authentication database the greater the opportunities for the security system to be defeated. For example, each time the authentication database is transmitted or updated, there is increased likelihood that the authentication database may be captured by an unintended recipient and the encryption scheme attacked.

One conceivable way in which to add a secured server to an existing network, without replicating the authentication database in the new server, is to modify the client software and/or the server software in every existing computer on the network. Updating all computers is not only an extremely burdensome task, but compatibility difficulties may also arise in making such wholesale modifications.

OBJECTS AND SUMMARY OF THE INVENTION

Accordingly, it is an object of the present invention to provide a method and system for inserting a secured server into an existing network, wherein the inserted server does not maintain a database of the authentication information therein.

It is another object to provide a method and system as characterized for that enables users to access any of a plurality of secured devices with a common set of credentials.

It is a related object to enable the administration of a network security system through the maintenance of a single database in one of the network devices, thereby eliminating the need to maintain multiple copies of the database.

It is a related object of the invention to provide a method and system of the above kind that is compatible with currently existing networks, and in particular NetWare®-based networks.

Briefly, the invention provides a method and system for adding a secured network server to an existing network for access by a client thereof, wherein the added server does not possess a database of authentication credentials. After connecting to an authenticating agent having a database of authentication credentials, which may include information from a bindery comprising users, groups and passwords, the client is first authenticated for access to the added server by passing authentication requests received from the client to the authenticating agent. The responses from the authenticating agent are then evaluated, and if the response indicates validity, the client is the granted access to the added server.

Database services are provided to the authenticated client by first evaluating database requests received from the client. Requests seeking authentication credential information are handled by passing them to the authenticating agent and using its response to reply to the client. Non-authentication credential information requests are handled locally.

Other objects and advantages will become apparent from the following detailed description when taken in conjunction with attached drawings, in which:

BRIEF DESCRIPTION OF THE DRAWINGS

FIGS. 7A–7D represent a series of response and request data packets formatted in accordance with the NCP protocol for connecting the network server to the authenticating agent;

FIGS. 8A–8M represent a series of response and request data packets formatted in accordance with the NCP protocol for logging a client onto the network server;

Figure 1:
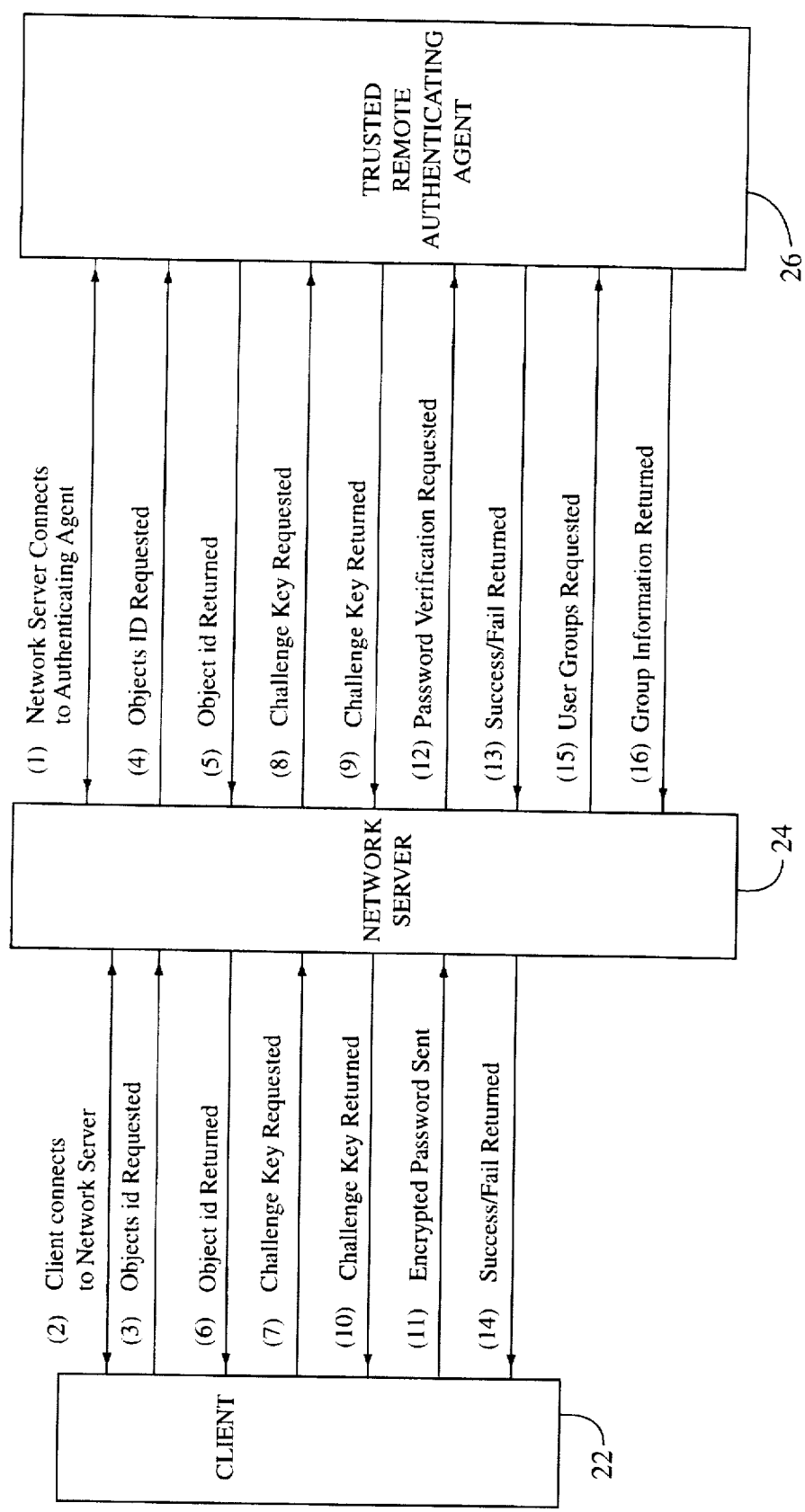
FIG. 1 is a diagram representing the general sequence for logging onto a network server in communication with an authenticating agent according to the invention.

While the invention is amenable to various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE PREFERRED EMBODIMENT

The present invention provides a method and system for dynamically adding a secured network server, which does not possess the database of authenticating information, to an existing network. A first aspect of the invention therefore is directed to remote authentication of a user so that only authorized users can log into the server.

Figure 3:
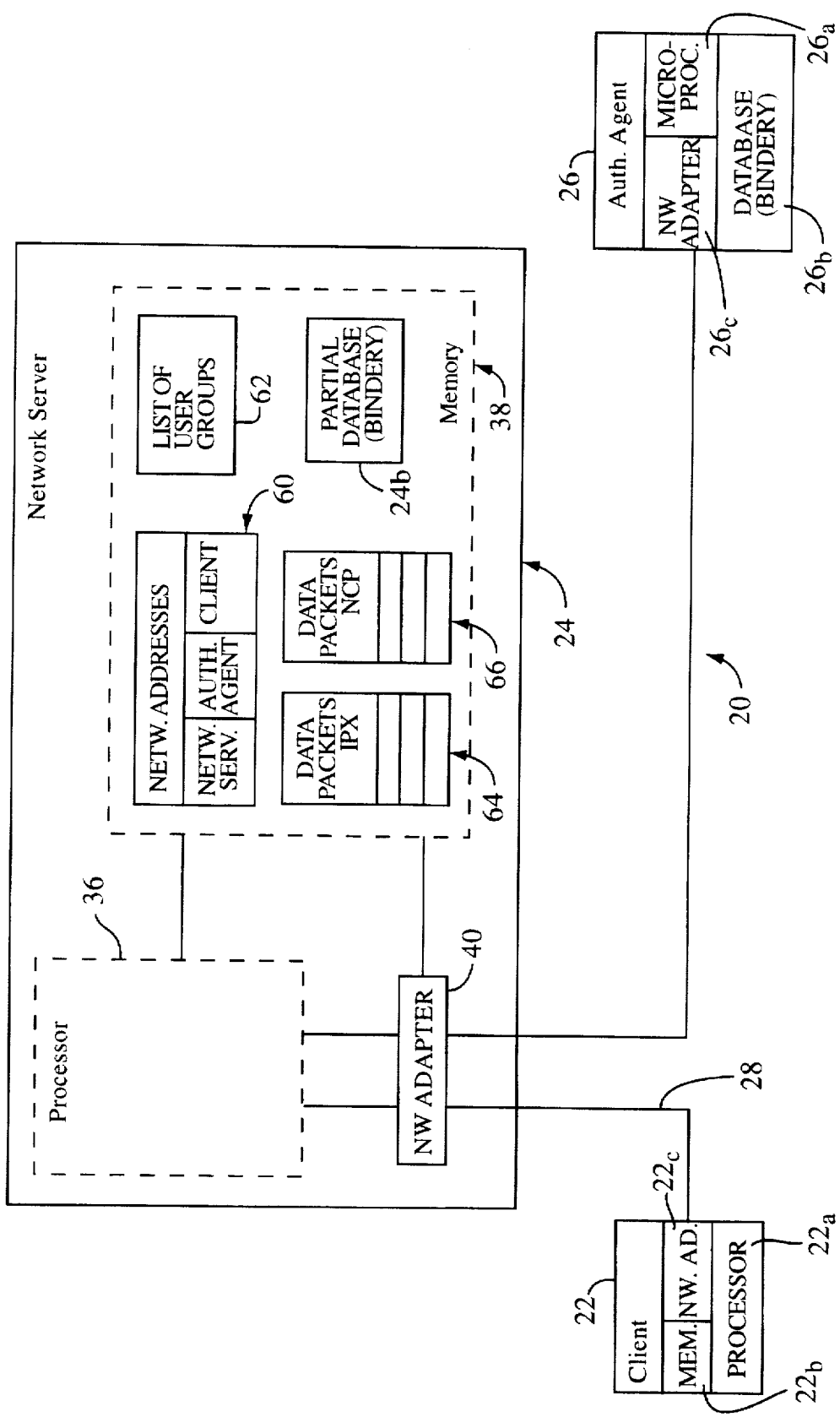
FIG. 3 is a functional block diagram illustrating components in a network server connected to authenticate a user via communication with an authenticating agent according to the present invention.

FIG. 1 shows the general functional sequence of steps used to login to a network server using the trusted remote authentication security system. As set forth in step 1 and as described in more detail below, the network server 24 first makes a connection to a second network server, the trusted remote authenticating agent (or security provider) 26, which contains a database of authentication information $26_b$ (FIG. 3). In a preferred embodiment exemplified herein, the authenticating agent 26 is a Novell® NetWare® server, and the network server 24 comprises a Microsoft® Windows™ 95 machine, i.e., a personal computer operating under the Microsoft® Windows™ 95 operating system. Such Windows™ 95 machines may be arranged to provide file sharing services, RPC services, backup services, remote-node access services (for modem access), printer sharing services and the like.

After connecting to the authenticating agent 26, a client workstation 22 on the network 20 connects to the network server 24 (step 2). At this time the network server 24 can receive a login request from the connected client workstation 22. Alternatively, it is feasible that these steps may occur in the reverse order. For example, the network server 24 may wait until receiving a login request from a client workstation before initiating a connection with the authenticating agent 26.

Regardless of the order of the connections, the client 22 initiates the request for access as shown in step 3 by transmitting a request to the network server 24 in order to obtain its own corresponding object ID. As described in more detail below, the client 22 sends a data packet containing this request to the network server 24 along with the client's object name.

In accordance with one aspect of the invention, because the network server 24 does not possess the object ID, the network server 24 passes this bindery request and the object name to the authenticating agent 26 as shown in step 4. The authenticating agent 26 responds by returning the corresponding object ID number at step 5. In this capacity, the network server 24 is functioning as a client of the authenticating agent 26.

The login procedure continues at step 6, wherein the object ID is returned by the network server 24 to the client 22, and at step 7, wherein the client 22 transmits a request for a challenge key to the network server 24. As described in more detail below, the object ID, client password and challenge key are all encrypted in an irreversible manner by an encryption algorithm at both the client 22 and the authenticating agent 26. The resulting encrypted passwords are compared at the authenticating agent 26. Thus, the authenticating agent 26 provides the challenge key.

In keeping with the invention, as shown in step 8 the network server 24 passes this challenge key request to the authenticating agent 26, which then responds by returning an appropriate challenge key at step 9 to the network server 24. At step 10, the network server 24 passes the challenge key back to the client 22.

The client 22 utilizes the challenge key to internally encrypt its password, and sends the encrypted password to the network server 24 at step 11 within a login request. However, since the network server 24 does not want to login to the authenticating agent 26 with these credentials, the network server first converts the login request to a verification request instead of passing the login request to the authenticating agent 26. After the conversion the verification request is sent (step 12). The authenticating agent 26 verifies the password with its authentication database $26_b$ by performing an analogous encryption using the challenge key it previously sent to the client 22 via the network server 24.

After comparing the received encrypted password with the calculated one, the authenticating agent 26 responds with information indicative of whether the password was valid or invalid for that user, i.e., it returns success or failure information at step 13, which the network server 24 returns to the client 22 at step 14. As described in more detail below, the network server 24 evaluates this success or failure information to determine whether the client is to be allowed access to its services. In this manner, the network server 24 authenticates the client without needing its own list of users or passwords in its own database (bindery) $24_b$ by trusting the result of the verification made by the authenticating agent 26 against its authentication database $26_b$. Finally, at steps 15 and 16, the network server 24 requests, and the authenticating agent 26 returns, the list of user groups to which the user belongs.

Although not necessary to the invention, so that the network server 24 does not need to further communicate with the authenticating agent 26 each time a request is made by authorized clients connected thereto, the network server 24 maintains its own list of groups that each user belongs to, which provides information on which of its own services are available to the users and/or user groups based on their rights. This list is obtained at the time of the login, and remains valid for the duration of the session for use in access control. Alternatively, it is feasible to update the list of user's group memberships while the user is logged in, such as by having the network server 24 periodically request and obtain an updated list of users and user groups from the remotely located authentication database $26_b$ of the authenticating agent 26.

Keeping the above general functional flow in mind, more detailed steps to accomplish the authentication aspect of the invention are described below. While it can be appreciated that any number of protocols may be used to transmit the data packets on the network, the protocols described herein are the Internetwork Package Exchange (IPX®) protocol and the NetWare® Core Protocol (NCP). It can be readily appreciated that the protocol between the network server 24 and the authenticating agent 26 may be different from the protocols agreed upon between the network server 24 and the client device 22.

Moreover, while the preferred embodiment describes a specific challenge/response protocol which uses a series of requests and responses that take place during an IPX®/NCP login procedure, it is feasible to implement a login procedure that only requires a single request from the client, which is translated and/or forwarded to the authenticating agent, followed by one or more responses that are evaluated by the server and returned to the client. For example, if an initial request to login contains all of the client credentials, it is only necessary to translate and forward this one request to the authenticating agent, which in turn only needs to respond once as to whether the credentials are valid or invalid. Accordingly, the terms "request" and "response" as used herein are intended to include one or more preceding or subsequent data transmissions that are necessary to generate or complete a particular request and/or response according to the protocol in use.

Figure 2:
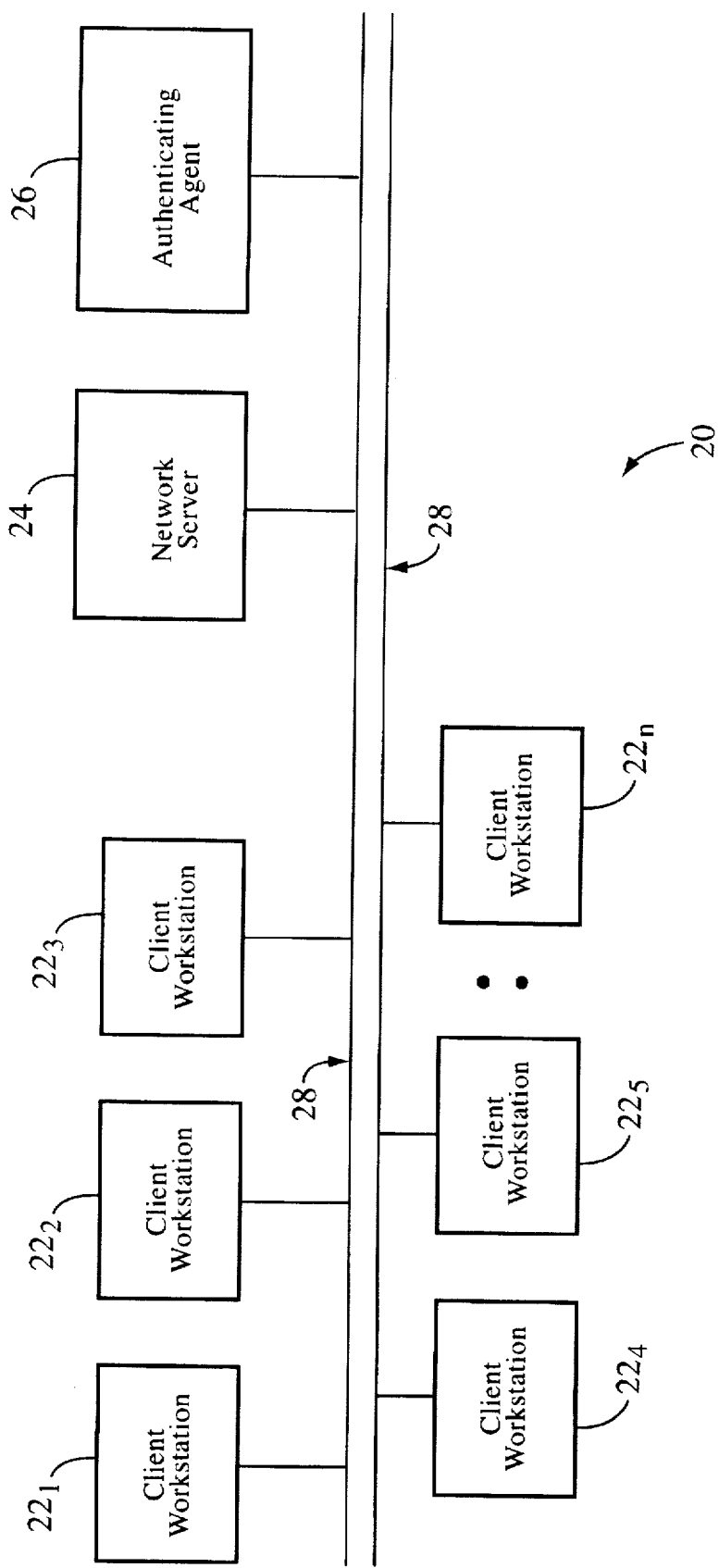
FIG. 2 is a block diagram of a computer network having a network server connected for communication with multiple client workstations and for communication with an authenticating agent.

Referring now to FIG. 2 of the drawings, there is shown a block diagram of a network, generally designated 20, which may use the security system of the present invention. The network 20 comprises a number of computer-based devices interconnected on a communications link 28 in a conventional networked manner. The communications link 28 may comprise any well known data transmission medium, for example, fiber optic cable, 75 ohm coaxial cable and the like, in accordance with a chosen standard for hardware interfaces within each of the devices. Such standards, including ARCnet®, Ethernet® and Token Ring®, and their associated hardware interfaces are well known in the art, and thus are not described in detail herein. Suffice it to say that many commercially available interface boards may be used to connect computer-based devices in a networked fashion.

In general, a number of client workstations $22_1-22_n$ or other network devices, which may be personal computers or the like, are connected to the communication link 28 as are the network server 24 and the authenticating agent 26. Other devices, such as printers, routers or additional servers may be present on the network, but are not shown herein for purposes of simplicity. Although FIG. 2 shows a single network configured in a bus network topology, the present invention may be implemented in a multiple bus network topology, for example where the network server links multiple networks together. In addition, the present invention may be implemented on other types of networking topologies including bus, ring or star topologies.

Figure 4:
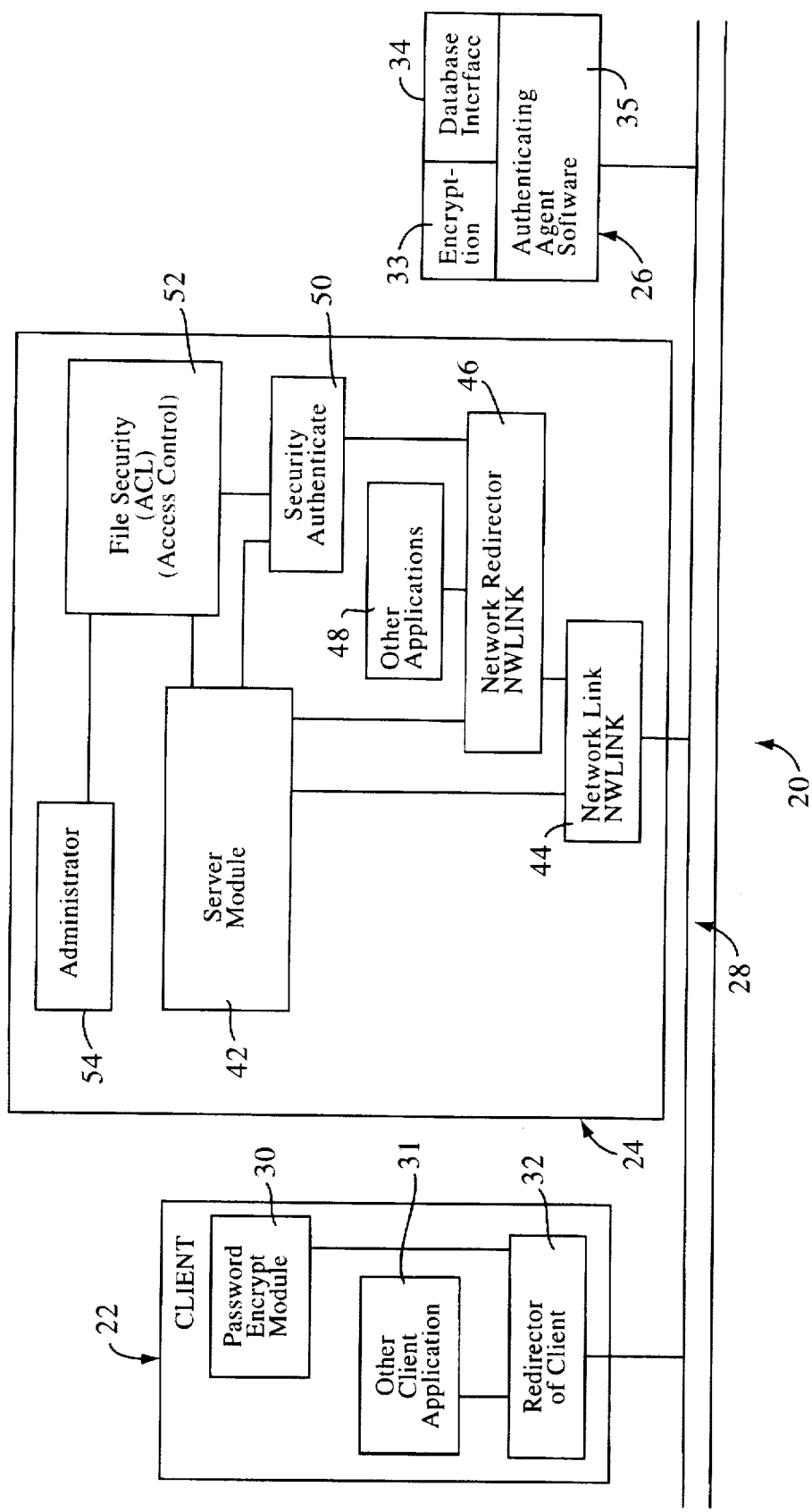
FIG. 4 is a block diagram illustrating software modules of the network server of FIG. 3.

As previously described, the authenticating agent 26 typically comprises a Novell®-based NetWare® server including a database 26$_b$ therein, also known as a bindery or bindery emulation (FIGS. 2 and 3). The database 26$_b$ contains lists of network resources, valid users, and associated user information, including an associated password stored in encrypted form for each user, and a list of groups to which the user belongs. The authenticating agent 26 also includes the encryption scheme 33 that conforms to the encryption algorithm 30 present in the client device 22 (FIG. 4).

As shown in FIG. 3, the client device 22 includes a processor 22$_a$ conventionally connected to a memory 22$_b$, and input-output means including a network adapter 22$_c$ for connecting the device to the communications link 28. Alternatively, a communication device such as a modem or the like may be used to connect the devices. As shown in FIG. 4, the client device 22 also includes client application software 31, and a redirector software driver (module) 32 for interfacing the application software 31 of the client device to the communications link 28.

For example, if the client application software 31 requests access to a disk drive (not shown) of the network server 24 (such as F:), the request will be recognized by the redirector module 32, formatted into a data packet of the appropriate protocol, and transmitted onto the communications link 28 via the network adapter 22$_c$. However, the redirector module 32 will not similarly act on a request to access an internal disk drive (not shown) of the client device (such as C:). Redirector module 32 also facilitates the returning of received responses to the application software program. The client device 22 also includes a password encryption software module 30 which is used to combine the password with a challenge key for logging into the network devices.

The network server 24 is typically PC-based and includes appropriate hardware and software for acting as a conventional server. As best shown in FIG. 3, the hardware includes a processor 36 operatively connected to a memory 38. The processor 36 is also operatively connected to a network adapter 40, which may be any suitable input/output device along with any corresponding software and/or independent processing means for transmitting and receiving communications to and from the communications link 28. As is well known, conventional network adapters 40 are located on a network card or the like plugged into a personal computer, or on the motherboard itself, and may be arranged to directly access the memory 38 (DMA), use direct memory mapping, shared memory techniques or programmed input/output to read and write the data packets 64, 66 in the memory 38. A preferred system may be implemented with a protected mode Intel-386 or better microprocessor, using the Windows™ 95 operating system employing an NDIS 3.1 Media Access Control (MAC) driver.

The software in the network server 24 is preferably separated into layered modules for performing the various network server functions, including handling the authentication of clients. It can be readily appreciated that the software need not be separated into functional modules at all, or may be separated in many other different ways, however the described arrangement has been found to effectively organize the software into functional blocks to facilitate enhancements, modifications, debugging and the like.

Thus, as shown in FIG. 4, one software module, Server Module 42 is an executing program on the network server 24 which performs various server functions and also coordinates the operation of several other software modules. For example, if the network server 24 is acting as a file server, the Server Module 42 manages typical operations on files such as read, write, close, delete, and so on. Such network server software is well known and is not described herein.

To facilitate communication with the clients, a software module Network Link 44 is provided to allow the processor 36 to control the network adapter 40 and to interface client requests received on the communications link 28 to the Server Module 42. Network Link 44 also handles the outputting of responses to the clients. Network Link 44 preferably includes Microsoft® Corporation's 32-bit network transport protocol stack software, NWLINK, "Microsoft® IPX/SPX-compatible Protocol for Windows™," as well as MAC driver software that conforms to the NDIS standard.

Since the network server 24 also functions as a client of the authenticating agent 26, for example when authenticating a client 22, a software module Network Redirector 46 is provided to interface the Server Module 42 and other application programs 48 with the communications link 28 for communication with the authenticating agent 26 as a client. Network Redirector 46 is preferably Microsoft®'s 32-bit software, NWREDIR, known as "Microsoft® Client for NetWare® Networks." The server module 42 is preferably Microsoft®'s server software, NWSERVER, known as "Microsoft® File and Printer Sharing for NetWare® Networks®." The redirector software 32 in the client 22 is preferably a NetWare® compatible software module, such as NWREDIR or Novell®'s NETX shell or VLM.

Significantly, the network server 24 does not possess any authentication information. Thus, when dealing with users, passwords or groups the network server must communicate with the authenticating agent 26. The network server 24 does possess a local database (bindery) 24$_b$ of its own for maintaining certain local objects such as printer services and print queues, but it is only a partial bindery because it does not contain user objects, group objects, or passwords.

Although the network server 24 does not store a copy of the authentication database locally, the network server 24 keeps its own copy of the authentication database's group membership lists for each logged-in user in its memory 38, (FIG. 3) so that user rights may be verified for each user request of the network server 24 without having to communicate over the communications link 28 with the remote database 26$_b$. These group memberships are assumed to stay valid until the user has logged off. The user's group memberships are obtained via the security module 50, using NCP functions "Read Property Value" (function 17h, subfunction 36h) for property "GROUPS_I'M_IN" and "Get Bindery Object Name" (function 17h, subfunction 36h). An access control module 52 is provided to manage the access control functions for each resource to ensure that a user has the necessary rights to access a particular resource. An internal access control list ACL is maintained by the network server 24 in its memory 38. The ACL maintains the names of users and groups which are entitled access to each resource. In this manner, access control is performed by the network server 24.

By way of example, if the network server 24 is acting as a file server and request from a user is received that attempts to open a file in write mode, the access control module 52 acts as a file security module and first checks the rights of the requesting user by reading the user's rights stored in its local ACL 62. The module informs the Server Module 42 whether the rights indicate that the request should be granted or denied. The Server Module 42 then takes appropriate action such as allowing the file to be written (access granted) or informing the client of the lack of rights (access denied).

In accordance with the invention, a primary function of the Security Authentication module 50 is to control the authentication of users by directing the transmission of login requests from potentially valid users to the authenticating agent 26 and to evaluate and return responses therefrom to the requesting user. As described in more detail below, the network server 24 trusts the determination of validity or invalidity of the client credentials made by the authenticating agent 26, in order to grant access to authorized users and to deny access to unauthorized users.

As shown in FIGS. 3–4, the authenticating agent 26 comprises a typical network server having a disk drive containing a database $26_b$ (typically a bindery or emulated bindery) stored therein. A processor $26_a$, and a suitable network adapter $26_c$ provide a platform for the authenticating agent software module 35 (FIG. 4) having an encryption algorithm 33 for performing analogous encryption to verify encrypted passwords received from the user. Database interface software 34 is also provided.

As is well known, communication between these and other devices on the network 20 occurs as data packets formatted in accordance with agreed-upon protocols are transmitted and received over the communications link 28. Since the authenticating agent 26 in the described embodiment is a Novell® NetWare® Server, the communication protocols are selected accordingly. Such Novell® NetWare®-based devices are often arranged to follow the IPX® protocol in the Network layer of the Open Systems Interconnections (OSI®) model. IPX® is a connectionless protocol that does not require acknowledgement when sending a packet, known as a datagram, and thus does not guarantee packet delivery.

Figure 6A:
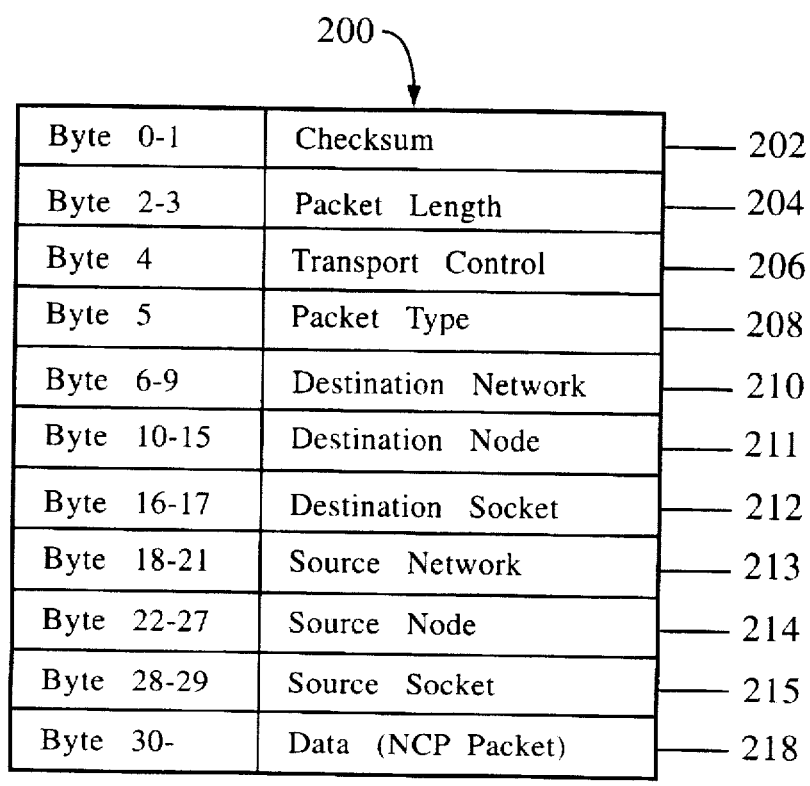
FIG. 6A illustrates the structure of an IPX data packet.

The IPX® protocol operates via the transference of a data packet comprising a 30 byte header followed by a variable length data field, as shown in FIG. 6A. The IPX® packet is ordinarily part of a larger MAC protocol envelope. The IPX® header is placed after a MAC Header (not shown) and its data portion is followed by a MAC trailer (not shown). For example, the MAC header may include the destination address of a router node for rerouting the data packet to the appropriate device. These MAC headers are modified in a known manner by LAN drivers as a datagram is rerouted, however, for simplicity, since such network routing techniques are well known, routing is not described herein.

In the OSI layers above the underlying IPX® Network layer, i.e., the transport and session layers, Novell® NetWare® devices frequently communicate via the NCP protocol. The NCP packet occupies the data portion of an IPX® packet. NCP is a largely undocumented half-duplex, request/response protocol. To communicate using the NCP protocol, an originating device initiates a communication by providing a request; a server processes the request and responds accordingly. The originating device receives and processes the response, and, based thereon, takes some further action, which often includes transmitting another request. Additional information regarding the NCP protocol can be found in an article by Pawel Szczerbina entitled "Novell®'s NetWare® Core Protocol," Dr. Dobb's Journal, November, 1993, pp. 123–132, and in a publication by Charles G. Rose entitled "Programmer's Guide to NetWare®," McGraw Hill, 1990. These references are herein incorporated by reference in their entireties.

FIG. 6A illustrates the structure of a standard IPX® data packet 200. As is well known in the IPX® protocol, the data packet (datagram) 200 includes a 30 byte header in which the first two data bytes, bytes 0–1 in field 202, are reserved for a Checksum. However, Novell® NetWare® has historically not used checksums in the IPX® header, and thus these bytes are set to FFFFh, where lowercase h represents hexadecimal.

The subsequent two-byte field 204 is reserved for the Packet Length, which includes the length of the IPX® header itself and the length of the data in field 218. Since the IPX® header information comprises 30 bytes (decimal) the actual length placed in this field 204 must be at least thirty.

The next field 206, known as Transport Control, is a single byte of data initially equal to zero that is incremented each time the packet passes through a router (not shown) on its way to its destination. Once this value reaches 16, packets are automatically discarded, since no more than fifteen routers should be present on a transmission path between a source device and the packet's ultimate destination, and thus a number exceeding this limit is ordinarily not supported by IPX®.

The following field, 208, is a single data byte indicative of the packet type. In the present situation, this byte is set to 11h, which Novell® NetWare® recognizes at this location in an IPX® header packet as indicating that the NCP protocol is in use at the above (OSI) layers.

The subsequent fields 210–212 (bytes 6–17) identify the network, node and socket addresses for the destination device. The destination socket address (field 212) equals 0451h for NCP packets directed from the client 22 to the network server 24.

The next three fields 213–215 (bytes 18–29) in the header of the IPX® packet are similarly arranged to represent the source address of the network, node and socket, respectively. The network server 24 has its own addresses stored in its memory 38 (in NWLINK), and will thus fill these fields (213–215) with its own network, node and socket addresses when transmitting an IPX® packet. Field 218 (Bytes 30 and above) is the data field of the IPX® packet. This field 218 contains the NCP data packet when the NCP protocol is in use.

Figure 6B:
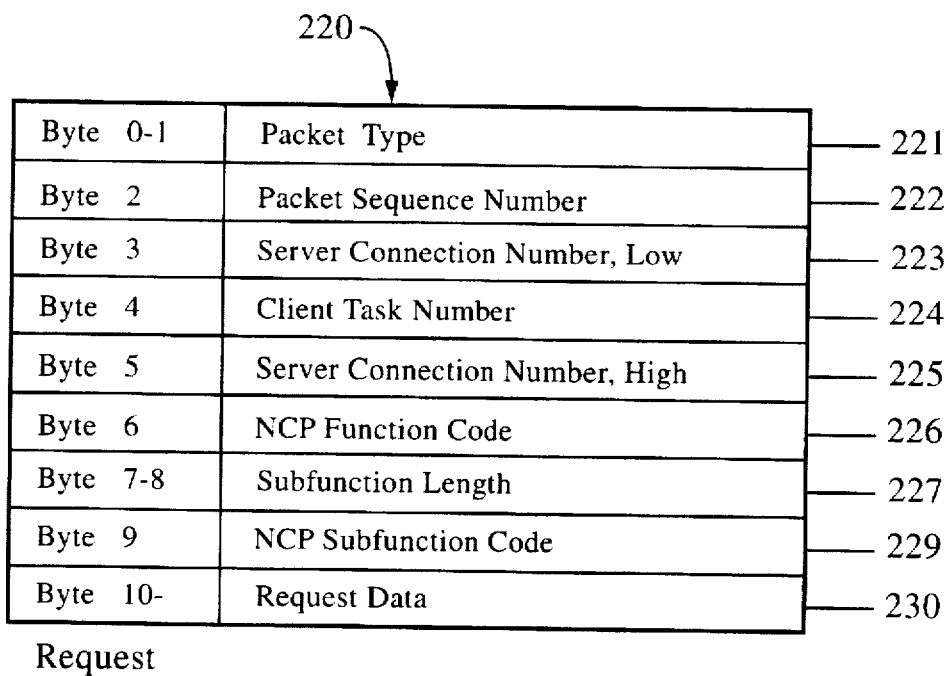
FIG. 6B illustrates the structure of an NCP data packet for transmitting a request.
Figure 6C:
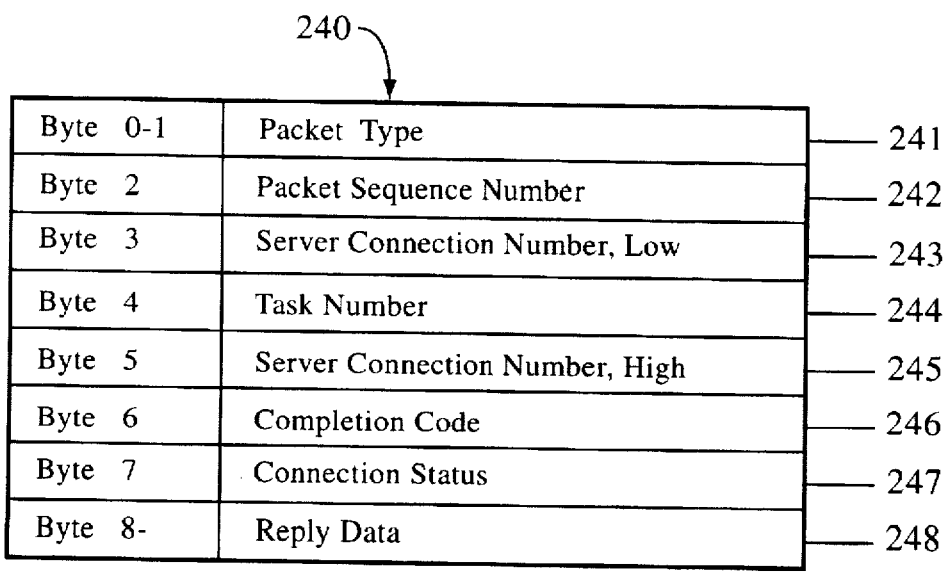
FIG. 6C illustrates the structure of an NCP data packet for transmitting a reply.

FIGS. 6B and 6C illustrate the structure of two different types of commonly transmitted NCP packets 220, 240 which may be sent in the data field 218 of an IPX® data packet. Since there are several types of NCP packets, the first two bytes (field 221 or field 241) of an NCP packet are reserved for identifying the packet type. For example, the first two bytes of NCP packets formatted as request packets (FIG. 6B) are filled with 2222h, while the first two bytes of packets formatted as replies to requests (FIG. 6C) are filled with 3333h.

In the request packet 220 of FIG. 6B, (following the packet type field 221), field 222 contains a one-byte packet sequence number, initially set to 00h. In the NCP protocol, this number is echoed back from the server in the corresponding reply (field 242 of FIG. 6C). If the same sequence number is received back from the server, the client assumes the packet contains the response to its request and increments this number for any subsequent requests. If, however, an out-of-sequence response is received, the response is either a duplicate or assumed to be an error and is consequently discarded. When an error is received, or if no response at all is received, the client ordinarily retransmits the packet with the same sequence number, i.e. without first incrementing it. In this manner, the sequence number is used by the requesting device to ensure that responses properly correspond to the various requests.

The next field, 223, represents the low byte of a two-byte word which represents the server connection number. The high byte of the server connection word is located in field 225. When a connection is established with a server, as described in more detail below, these values are returned by the server in the reply packet 240 at fields 243 and 245 (FIG. 6C). This connection number will be used in all subsequent NCP packet transmissions between the server and the client, including when the network server 24 is acting as a client of the authenticating agent 26.

Since more than one task (e.g. application program) may be executing on the same connection, a client task number field 224 is provided between the high and low connection number bytes to identify the task to which the packet belongs. The task number is echoed back in Field 244 of the reply packet of FIG. 6C.

In the NCP request packet 220, a one-byte field 226 contains a function code which identifies the operation being requested. For example, if the request was being transmitted by the client for the purpose of opening a file, this field would be set to a unique value equal to 4Ch.

Certain functions in NCP request data packets require a subfunction code and/or associated data therewith, while other functions do not. It can be appreciated that the receiving server possesses a table or the like of function codes that allows it to know when a subfunction code and/or data is required, and how the remainder of the packet is organized based on the value of the function code. For example, when neither a subfunction code nor data is required, the function code is the last byte in the packet. When a function code requires data but does not require a subfunction code, data immediately follows the function code field 226.

Often, functions codes which do require a subfunction code are immediately followed in field 227 by a two-byte (word) indicative of the subfunction length, including a length of at least one (byte) for the length of the subfunction code field plus the length of any accompanying data. The one-byte subfunction code follows in field 229. Finally, any data sent in the request packet is sent in field 230.

In an NCP reply packet, following the high byte of the connection number (field 245) as described above, field 246 contains a completion code. The completion code field equals 00h when a request was successfully acknowledged and granted. A non-zero value in the completion code field 246 frequently indicates an error, the actual value of which is ordinarily used to represent an errorcode.

At field 247, a byte indicative of the connection status is also provided. The lower four bits (0–3) of this byte are set to 0 when the connection is alive, and to an errorcode between 1 and 15 when the connection is not valid. Bit 4 indicates whether the server is down, and bit 6 indicates that the connecting device has a message waiting at the server.

Figure 5A:
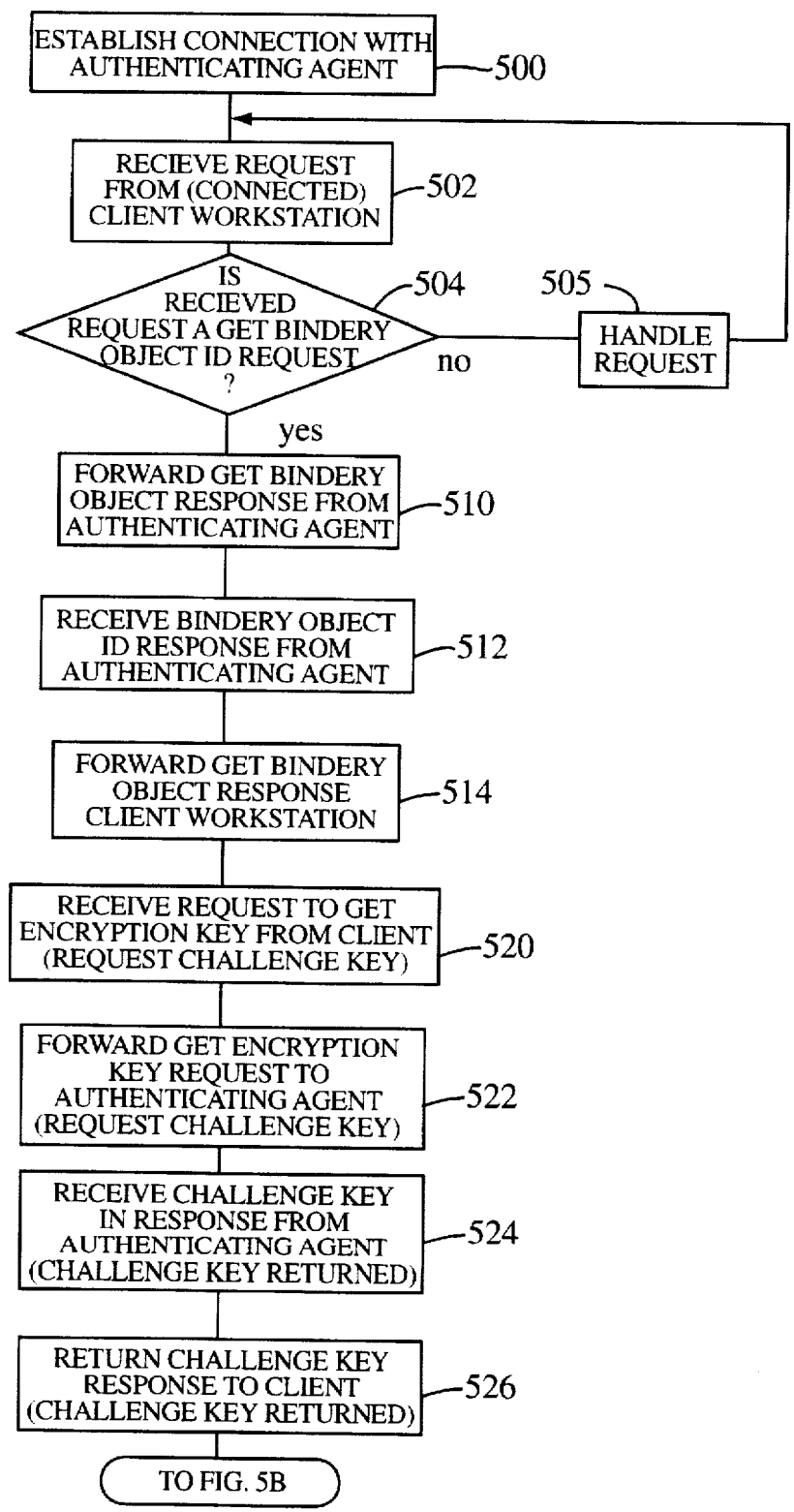
FIGS. 5A–5B comprise a flow diagram illustrating the general sequence of events at the network server of FIG. 3 for granting or denying a user access thereto according to the responses of an authenticating agent employing the IPX® and NCP protocols.
Figure 5B:
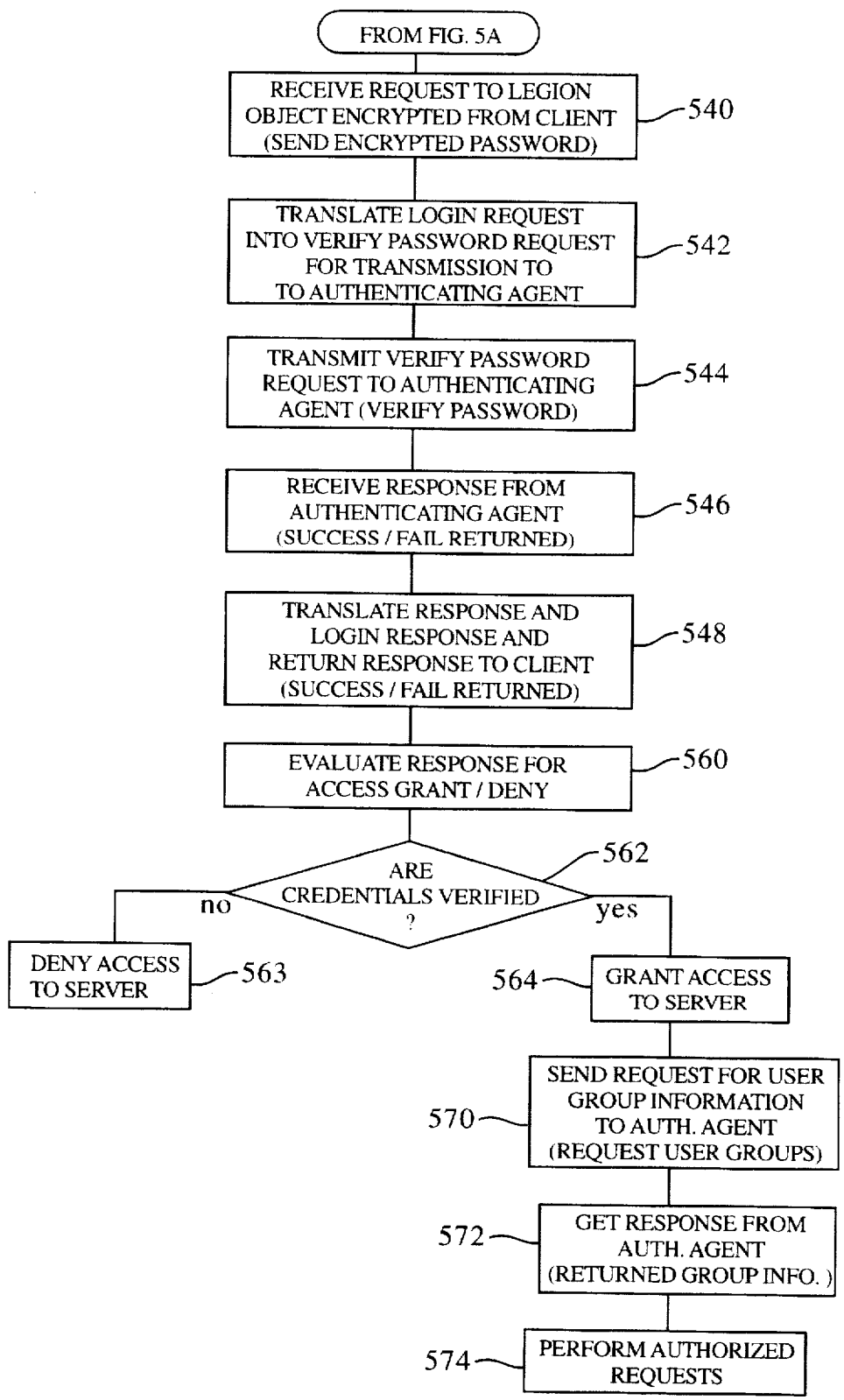

Turning now to an explanation of the authentication aspect of the invention with particular reference to the flowchart of FIGS. 5A–5B and the data packets represented in FIGS. 7A–7D and 8A–8M, the network server 24 must have a connection (as a client) to the authenticating agent 26 at step 500 (FIG. 5A). If an existing connection is already present, i.e., the network server 24 is connected to the authenticating agent 26 as a client for other applications, no additional connection needs to be made. In such a situation, the network server 24 utilizes the existing connection for authentication of a client 22, thus conserving the number of connections.

If no existing connection is present, then one must be established. For this purpose, sometime before such a connection is established, a special account, in this embodiment named WINDOWS_PASSTHRU, has been set up on the authenticating agent 26. This one-time setup gives the network server 24 minimal rights when connected to the authenticating agent 26 with, including rights to read the user and group lists in the authentication database 26$_b$.

To accomplish the connection, the network server 24 (via Server Module 42 and Network Redirector module 46) formats an IPX® data packet having an NCP data packet within the data portion of the IPX® packet and transmits the IPX® packet via network adapter 40 (FIG. 3) onto the communications link 28.

The IPX® packet has in its destination fields the network, node and socket addresses of the authenticating agent 26, and thus when transmitted on the network the packet is received by the authenticating agent 26. When properly received, the authenticating agent 26 responds by sending an IPX® packet addressed to the network server 24. Since the IPX® protocol is well documented, only the NCP data packets of the IPX® packet will be described herein in detail.

FIG. 7A shows the NCP packet 300 sent by the network server 24 for requesting the creation of a connection to the authenticating agent 26. The data packet 300 has a first two-byte packet-type field 301 equal to 1111h, which is a special packet type identifier indicating that the packet 300 is being sent as an Create Connection (Allocate Slot) Request, i.e., a request to create the service connection.

The following byte, in field 302, contains the one-byte packet sequence number, initially 00h, which in the NCP protocol is echoed back from the server in the corresponding reply as described above. The server connection number in fields 303 (low) and 305 (high) are at this time set to FFFFh since no connection has yet been made. Similarly, the client task number in field 304 is initially set to 00h since there is no connection yet, and thus there cannot be any tasks using it. Function code field 306 is set to 00h since the purpose of this packet is already identified in the packet type field 301, and no further subfunction code or data is necessary.

The NCP response packet 310 replying to the Create Connection Request is shown in FIG. 7B and includes a two-byte field 311 equal to 3333h, which indicates that this is a reply to a request. Assuming there was no transmission or other error, field 312 returns the packet sequence number that the client provided in the corresponding request, 00h.

As described above, the response packet 310 also includes a server connection number, herein shown as a representative value equal to 0048h at fields 315 (high byte) and 313 (low byte). This connection number will be used in all subsequent NCP data packets transmitted between the network server 24 and the authenticating agent 26. In addition, for this example the task number 00h is returned in field 314.

For simplicity herein, in all of the illustrated response packets and unless otherwise noted, the previously described completion codes indicate a successfully executed request i.e., the completion code byte equals 00h. Moreover, the connection is assumed to be alive, the server up, and no message waiting, i.e., the connection status byte equals 00h.

Thus, in keeping with the example, fields 316 and 317 are equal to 00h in the reply packet 310.

After a slot is properly allocated, the network server 24 and the authenticating agent 26 next negotiate the maximum size of the NCP data packets in a known manner. This is accomplished as the client 22 formats and sends an NCP negotiate buffer request packet, shown in FIG. 7C as request packet 320.

The negotiate buffer NCP request packet 320 is formatted by the network server 24 such that its first two-byte field 321 equals 2222h, which indicates that the packet is being sent as a request packet. The second byte in field 322 is the packet sequence number, now incremented by the network server 24 to 01h as described above.

The next field, field 323, along with field 325, is filled with the server connection number that was returned in the previous response (in fields 315 and 313 of FIG. 7B) as 0048h. The client task number field 326 is remains at zero.

Field 326 contains a function code equal to 21h which identifies the operation being requested by the device. In the NCP protocol, 21h is a function code indicative of a negotiate buffer size request. According to the NCP protocol, a negotiate buffer request has no subfunction code. Consequently, the data sent by the network server 24 representing the size of its buffer, herein 200h, (512 decimal) immediately follows the function code. Thus, field 327 is set to 200h.

The authenticating agent 26 responds with the an IPX® packet having in its data field 258 the NCP packet 330 of FIG. 7D. Field 331 is set to 3333h to indicate that this is an NCP reply packet, while field 332 returns the sequence number 01h. The other fields 333–337 contain the same information described for the previous response, i.e., the connection number, task number, completion code and connection status code.

In this particular response, a reply data field 338 is added to the packet and contains the server buffer size, herein equal to 400h (1024 decimal). Once the response is received, each device knows the other's buffer size, and the smallest of the two is used by both. Thus, in this example, 200h, as transmitted by the network server 24, becomes the buffer size since that is the smaller of the two.

Once the buffer size has been negotiated, the network server 24, acting as a client, has created a connection to the authenticating agent 26, giving it minimal rights. However, at this time the network server 24 has not logged into the authenticating agent 26. Moreover, although the connection has been established, it is not necessarily dedicated solely to the Server Module 42 (FIG. 4). Since a client generally has only one connection in the NCP protocol, if another application program 48 running on the network server 24 requests access to the authenticating agent 26, the Server Module 42 and security authenticate module 50 must release its connection and share it with the other application program.

As shown at step 502 in the flowchart of FIG. 5A, after this initial connection between the network server 24 and the authenticating agent 26 has been successfully made, the network server 24 waits for a client workstation 22 to connect to it and request to login. The client 22 establishes a connection to the network server 24 in a manner similar to that just described wherein the network server 24, acting as a client, established a connection to authenticating agent 26. For purposes of this example, the connection number sent from the network server 24 to the client workstation 22 has been chosen as 0005h.

After the client 22 establishes a connection to the network server 24, the client ordinarily first issues a logout request. FIG. 8A represents the NCP logout request packet 350 that performs this function. Again, field 351 contains 2222h to indicate that this is a request packet, while field 352 is at 02h since the packet sequence number has been incremented once at the client 22 before sending its negotiate buffer request and once again for this packet. This packet sequence number is not the same as the sequence number that the network server 24 uses to communicate with the authenticating agent 26.

The server connection number, sent by the network server to the client during the connection step is set to 0005h in fields 353 and 355, and the client task number is at still set to 00h in field 354. Function code field 356 is set equal to 19h to specifically designate this packet as being a logout request. No subfunction code or data is necessary in this instance.

After the above-described logout step is performed, the user of the client workstation 22 initiates the authentication process at step 502 by transmitting to the network server 24 a request to perform a function known as "Get Bindery Object ID." The Get Bindery Object ID request ultimately returns a four-byte identification number (corresponding to the user login name) that is later used in the encryption of the password.

As shown in step 504 in the flowchart of FIG. 5A, when the network server receives a request from the client workstation 22 at this time, the processor 36, executing appropriate software, evaluates the function (and subfunction) codes to determine if the NCP packet denotes a Get Bindery Object ID request. If another function and/or subfunction code is detected, the network server 24 handles it at step 505, for example by rejecting the request and initiating the transmission of a message to the client indicating that the client is not logged in.

Conversely, if as shown in FIG. 8B the packet is indeed a Get Bindery Object ID request, at step 510 of FIG. 5A the processor 36 executing appropriate software modifies the IPX® packet and the NCP packet therein in order to pass it to the authenticating agent 26.

To this end, the IPX® header packet is modified by changing the source (client 22) and destination (network server 24) addresses to those of the network server 24 and the authenticating agent 26, respectively. The packet length, sent in field 204 will not change at this time since the client's NCP request packet is not changing size.

The NCP data packet is shown in FIG. 8B before being copied for and sent over NWLINK to the authenticating agent 26. As shown in FIGS. 8B–8C, the changes made to the packet as received from the client include loading the packet sequence number with the appropriate value based on the previous request/reply from the network server 24, replacing the connection number in fields 361 and 363 (0005h) to that previously supplied by the authenticating agent 26 (0048h) in fields 381 and 383, and placing the appropriate task number in field 382, shown here as 00h.

The NCP function code for the Get Bindery Object ID request in field 364 (FIG. 8B) is equal to 17h, and remains unchanged in function code field 384 (FIG. 8C) since the purpose of the request is not changing. Similarly, the subfunction code for this request, 35h, remains unchanged from field 366 to field 386.

In order to determine the bindery object ID for a user, the authenticating agent needs to know which user is attempting to login. The object type, 0001h for users, is thus also sent in field 367. Since the user's name is variable in length, the name's length is provided in field 368, followed by the login name entered by the user at the client workstation, chosen herein as "JOE" in data field 369. These bytes are passed unchanged in fields 387–389 by the network server 24 to the authenticating agent 26. Note that since in this example the user's name "JOE" is three bytes in length, the length fields 365 and 385 are equal to 0007h, (1 byte for the subfunction code, 2 bytes for the object, 1 byte for the length and 3 bytes for the name).

After receiving the packet, the authenticating agent 26 references its database $26_b$ and obtains the four-byte object ID for that user. To return this value, the authenticating agent 26 responds with the reply packet 390 of FIG. 8D. It can be readily appreciated that the authenticating agent 26 is only responding to the network server 24, since it is the network server 24 that is sending the request packets received by the authenticating agent.

In keeping with the invention, the network server 24 receives the response data packet at step 512 of FIG. 5A, and at step 514 copies the appropriate data from the packet and transmits it back to the client workstation 22. FIG. 8D represents the pre-copied reply data packet sent from the authenticating agent 26 to the network server 24, while FIG. 8E represents the post-copied reply data packet sent from the network server 24 to the client workstation 22.

Thus, fields 391 (FIG. 8D) and 401 (FIG. 8E) both identify their respective packets as reply packets by being set equal to 3333h. Field 392 returns a packet sequence number of 02h since that was the sequence number sent by the network server 24 to the authenticating agent 26, while field 402 echoes the sequence number of 03h previously sent from the client workstation 22 to the network server 24.

As before, the connection numbers returned from the authenticating agent 26 are adjusted by the network server 24 to the appropriate values for the client workstation 22, i.e., from 0048h in fields 393, 395 (FIG. 8D) to 0005h in fields 403 and 405 (FIG. 8E). If necessary, the connection status in fields 397 and 407 will be similarly modified to reflect the actual connection conditions, however in this example the connection status always remains at 00h.

The network server 24 relies on the reply returned by the authenticating agent 26. Thus, it does not modify the completion code (00h) received from the authenticating agent 26 in field 396 for transmission to the client workstation 22 in field 406. Likewise, the data returned in data field 398 (i.e., the bindery object ID chosen herein as 0033AA88h) is unchanged in field 408.

It can be appreciated that the process of 1) receiving a request from the client 22 at the network server 24, 2) adjusting the request and 3) transmitting it as adjusted to the authenticating agent 26, and then 4) receiving a response from the authenticating agent 26 at the network server 24, 5) adjusting it and 6) transmitting it to the client 22 continues in a like manner throughout the login procedure. In general, the client 22 requests are indirectly handled by the authenticating agent 26 by way of communication through the network server 24.

Once the client workstation is in possession of the object ID, the next step in the login process is for the client to obtain an encryption key. The encryption key is a random or pseudo-random number generated by the authenticating agent that is used in the subsequent password encryption process to enhance security. To obtain an encryption key, the client workstation 22 transmits to the network server 24 the NCP data packet 410 of FIG. 8F. As with other such requests, the packet type is set to 2222h (field 411) to denote it as a request packet, the sequence number is incremented (to 04h in field 412), and the appropriate connection number (fields 413, 415) and task number (field 414) are set to their appropriate values.

The function code for a "Get Encryption Key" request is a 17h with a one-byte subfunction code of 17h. No additional data is required with this function and subfunction combination. Accordingly, function code field 416 is set to 17h, length field 417 is set to a length of 01h, and subfunction code field 419 is set to 17h.

Upon receiving this request at step 520 of FIG. 5A, the network server 24 copies the request packet as previously described and transmits it to the authenticating agent 26 at step 522 of FIG. 5A. Thus, as shown in the post-copied "Get Encryption Key" request packet 430 of FIG. 8G, the packet type identifier in field 431 (2222h), and the function code (17h), length (01h) and subfunction code (17h) in fields 436, 437 and 439 are not changed. However, as before, the packet sequence number (03h) in field 432, the server connection number in fields 433 and 435 (0048h) and the task number in field 434 (00h) are changed to the appropriate values for transmission to the authenticating agent 26.

The authenticating agent 26 responds by formatting the reply packet 440 of FIG. 8H and transmitting it on the communications link 28 in an IPX® packet addressed to the network server 24. The network server receives the "Get Encryption Key" reply packet 440 at step 524 of FIG. 5A.

The received reply packet 440 to the "Get Encryption Key" request is similar to the "Get Bindery Object ID" reply packet 390 of FIG. 8D, except that the packet sequence number in field 442 is now appropriately returned as 03h, and the data in field 448 now contains the encryption key.

In keeping with the invention, at step 526 of FIG. 5A, the network server 24 copies the received reply packet 440 and transmits it to the client workstation 22. FIG. 8H represents the pre-copied reply data packet sent from the authenticating agent 26 to the network server 24, while FIG. 8I represents the post-copied reply data packet sent from the network server 24 to the client workstation 22. As before, fields 441 (FIG. 8H) and 451 (FIG. 8I) both identify their respective packets as reply packets by being set equal to 3333h. Field 442 returns a packet sequence number of 03h since that was the sequence number sent by the network server 24 to the authenticating agent 26, while packet sequence field 452 returns 04h to the client workstation 22. The connection numbers returned from the authenticating agent 26 are adjusted by the network server 24 to the appropriate values for the client workstation 22, i.e., from 0048h in fields 443, 445 (FIG. 8H) to 0005h in fields 453 and 455 (FIG. 8I). The completion code (00h) is not changed from field 446 to field 456, nor is the encryption key changed from data field 448 to data field 458.

The encryption module 30 in the client workstation 22 uses the earlier-received object ID and the encryption key just received to encrypt a password entered by the user. Once the password has been encrypted, the client 22 issues a "Login Object Encrypted" request packet 460 (FIG. 8J) to the network server 24, which receives the packet at step 540 of FIG. 5B. As shown in FIG. 8J, in this particular packet 460, the function code in field 466 is set to 17h, and the subfunction code in field 468 is set to 18h, which corresponds to this "Login Object Encrypted" request. The length packet is set to 0FH for the one-byte subfunction code, plus the eight-byte encrypted password, the object type, name length and name.

In keeping with the remote authentication aspect of the invention, the network server 24 translates the data packet and passes the encryption code therein to the authenticating agent 26 for verification at step 542 of FIG. 5B. However, unlike previous packets, during this particular translation the network server 24 also modifies the requested function of the request packet. This is because the network server 24 is not actually logging into the authenticating agent 26 with the client's credentials, but is instead only verifying the client's credentials. Accordingly, instead of sending a "Login Object Encrypted" request packet to the authenticating agent 26, the network server translates the login request packet to a "Verify Bindery Password Object Encrypted" request packet.

To this end, the network server 24 changes the subfunction code from a value of 18h in field 468 of FIG. 8J to a value of 4Ah in field 478 of FIG. 8K. The function code of 17h in fields 466 and 476 remains unchanged. As previously described, the other fields are modified as necessary for transmission to the authenticating agent. As also previously described, the translated request keeps the data portion of the packet intact (fields 469–472, FIG. 8J), and thus the encrypted password and related information is transmitted to the authenticating agent 26 without modification (step 544 of FIG. 5B). The related information in fields 470–472 includes the object type, the length of user name and user name "JOE."

The authenticating agent 26, which stores the transformed user's password in its authentication database $26_b$, is able to perform an analogous encryption, since it knows the encryption key just transmitted and the password for the user as encrypted by the object ID. The authenticating agent 26 compares the received encrypted password with the encrypted value that it calculated by referencing its authentication database $26_b$, i.e., it compares the actual received value with the value it expects to receive. If the encrypted password matches, the authenticating agent 26 responds by formatting the NCP reply packet 484 of FIG. 8L, which is received by the network server 24 at step 546 of FIG. 5B. If the password does not match, a different packet is returned as described below.

At this time, the network server 24 decides whether to grant or deny the user access. Accordingly, at steps 560 and 562, the NCP reply packet 484 of FIG. 8L is evaluated as stored in a packet memory section 66 in the memory 38.

The network server 24 determines if the authenticating agent 26 verified the client's credentials by evaluating the completion code in field 486, which is equal to zero if the password was verified as valid, or non-zero if the password was determined to be invalid.

In keeping with the invention, if the user's credentials are verified, at step 564 the client 22 is granted access to the network server 24. Of course, the network server 24 may also impose its own restrictions on user access. In the case where access is granted, information indicative of the valid login status of that particular client is stored in memory 38 so that requests therefrom will be appropriately received and handled until the client logs out. Conversely, if the credentials were determined to be invalid, at step 563 access is denied. By trusting the verification made by the authenticating agent 26, the network server 24 thus authenticates valid users without having to possess users and passwords in its own internal database to verify the password.

In addition to granting or denying status, the network server 24 informs the client 22 of the authentication decision so that the application program 31 (FIG. 4) executing in the client workstation 22 knows how to proceed further. Accordingly, at step 548 the network server 24 appropriately copies the original response packet 484 (in FIG. 8L) provided by the authenticating agent 26 and then returns the copied response to the client 22. The copied response packet 490 is shown in FIG. 8M, as modified for transmission to the client workstation 22.

Using the above-described remote authentication procedure, the network server 24 can authenticate multiple users of clients through its connection to the authenticating agent 26. However, in the above-described embodiment if multiple clients $22_1$–$22_n$ want to login to the network server 24 at the same time, the login procedure must be performed serially, i.e., one client at a time, since only one outstanding challenge request and challenge key are valid per connection.

At this time, the user is logged in to the network server. As can be appreciated, the server can provide file services, directory services, and print and queue services in a relatively straightforward manner. The network server receives a request packet, identifies the requested function, and performs an access control check. If the user has the proper authority, the server performs the requested service, (e.g. opens a file) and then returns an appropriate reply packet. Information about the numerous available functions are provided in the aforementioned publications by Pawel Szczerbina and Charles G. Rose, and will not be described in detail herein.

Once a user has logged in, the network server 24 may terminate the connection to the authenticating agent 26. This will be performed automatically if the network server 24 is not sharing an existing connection and if one minute elapses without any activity taking place on the connection to the authenticating agent 26.

However, while a connection is present, the network server 24 is further able to perform a number of additional functions that require access to the user and group objects maintained in the database $26_b$ of the authenticating agent 26. Thus, in accordance with another aspect of the invention, the server 24 is able to provide users with a number of database (bindery) services commonly available to users logged into servers having a complete bindery.

As previously described, the network server 24 has a partial database $24_b$ of its own wherein objects with types other than users and groups, e.g., printer objects, are stored. To provide bindery services for user and group information, the network server 24 must utilize the authentication database $26_b$ of the authenticating agent 26. Consequently, certain database-related requests are handled at the network server 24 locally, while those dealing with users and groups are handled by passing them through to the authenticating agent 26.

One request that is always passed through to the authenticating agent 26 is the Verify Object Password request. This is because only the database $26_b$ of the authenticating agent 26 contains passwords (in encrypted form), and thus only the authenticating agent can perform such a verification. The pass through to the authenticating agent 26 is handled as previously described, i.e., the source and destination addresses in the IPX packet are adjusted and the packet is sent. When the reply is received from the authenticating agent 26, the returned IPX packet is similarly adjusted for transmission to the client 22. For simplicity, the forwarding of packets and the returning of packets to and from the various devices will ordinarily not be described hereinafter.

Certain administration-related bindery requests that deal with users and groups are failed locally, however, without ever passing them through to the authenticating agent 26. This is primarily for security reasons, as the network server 24 is not intended to logged into the authenticating agent 26 at the supervisor level. Consequently, requests requiring write privileges, i.e., requests to add or delete objects, properties or values, are immediately failed locally. Such requests include the Add Object to Set, Change User Password, Create Object, Delete Object, Delete Object from Set, Rename Object, and Change Object Security requests. Others include the Change Property Security, Change Property, Delete Property, Write Property Value, Create Queue and Delete Queue requests. It can be readily appreciated that this does not significantly affect the vast majority of users, however, nor the system supervisor who may login to the authenticating agent 26 directly to effect such changes.

Requests that are handled locally at the network server 24 include Get Object Connection List, which returns the connection number for a given object, and Get Bindery Access Level, which returns the access level of the requesting user, known from the locally maintained ACL. Of course, all Printer Queue operation requests are handled locally, since the necessary information for print queue objects is kept in the local database 24$_b$.

Other types of requests, such as those based on the object ID or object type, may either be handled locally or passed through to the authenticating agent 26. How and where it is handled depends on whether the request is directed to database information kept at the authenticating agent's database 26$_b$ (user or group information), or whether the information is within the local database 24$_b$ (other object types).

By way of example, a user sending the Get Object Name request provides the four-byte object ID to a server expecting to retrieve the name (1 to 48 bytes in length) of the corresponding object, along with the object type. However, with the present system the user and group names are only maintained at the authenticating agent 26. Thus, for object IDs not kept locally, the request must be passed through to the authenticating agent 26 to locate the corresponding user or group name, if it exists.

Figure 9:
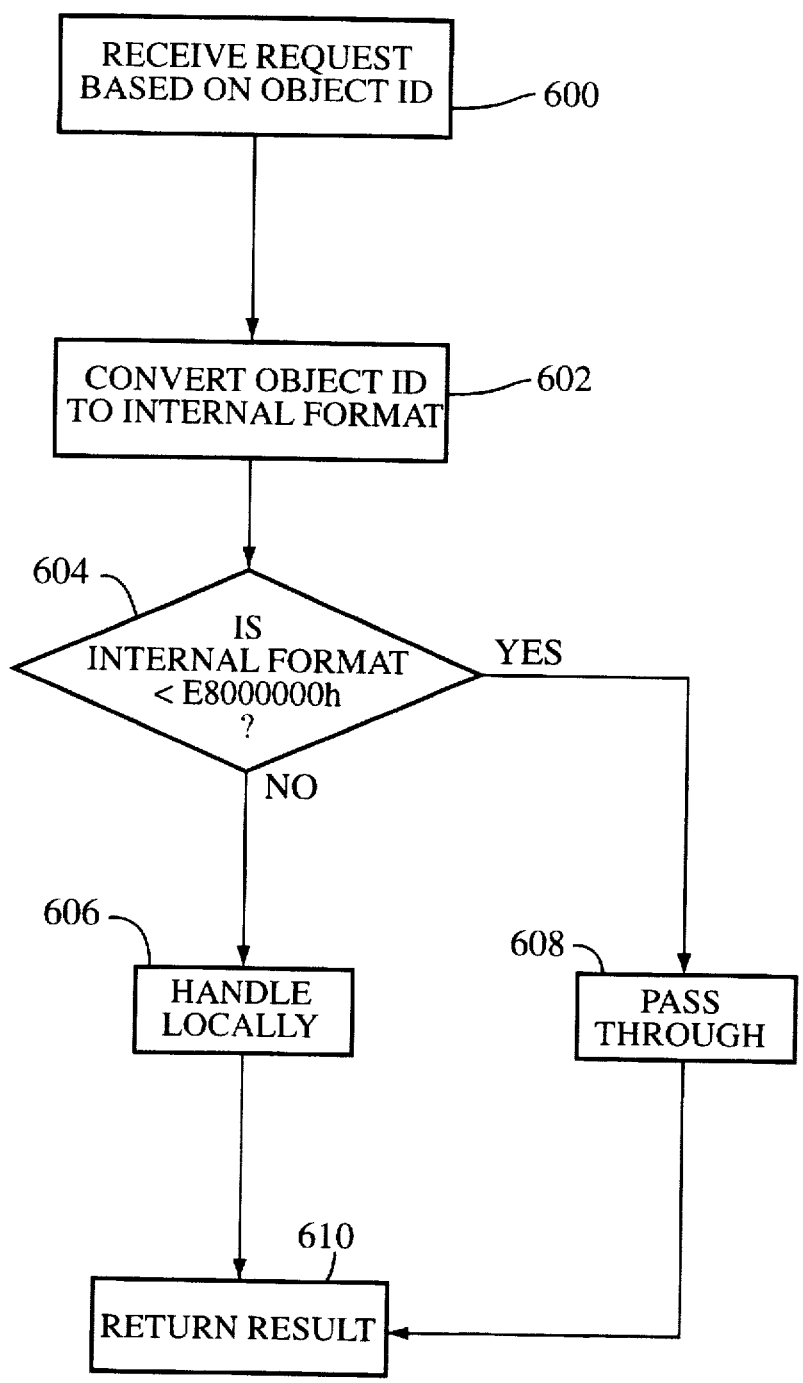
FIG. 9 represents a flow diagram illustrating the general steps taken when a service request based on an object ID is received at the network server.

FIG. 9 illustrates this process in more detail. The procedure of FIG. 9 is executed when a request based on an object ID (such as Get Object Name) is received, beginning at step 600. Because object IDs are received in a low-high format, it is necessary to convert them to the high-low format used internally. The conversion is performed at step 602.

The following step, step 604, determines whether the object, assuming it exists, is a locally created and maintained object or an object of the authenticating agent 26. Objects created and maintained in the local database 24$_b$ are all assigned numbers greater than E8000000h at their creation, to avoid conflicts with objects of the authenticating agent 26. Since the IDs assigned by an authenticating agent 26 to its objects is limited by the size of the database, it is highly improbable that a conflict will ever occur with these high numbers.

Thus, step 604 determines whether the object ID is greater than or equal to E8000000h. If so, the request is handled locally at step 606 by accessing the local database 24$_b$. If the ID is found, the name is returned at step 610 with a 00 completion code (success). If it is not found, a completion code of 0FCh is returned to indicate "No Such Object." Other error codes (e.g., FFh to indicate a bindery failure) may also be returned.

Conversely, if the number is between 0 and E8000000h, the request is passed to the authenticating agent at step 608. The result returned from the authenticating agent is returned to the user at step 610.

Other requests that require a determination of whether to handle them locally or remotely through the authenticating agent 26 include requests based on the object type. These requests include Get Bindery Object Id, Scan Bindery Object, Scan Property and Read Property Value, and require the client 22 to provide an object type to the network server 24. For example, as previously described, the Get Bindery Object Id request passes the object name and its object type to the server, for the purpose of getting back the corresponding ID.

Figure 10:
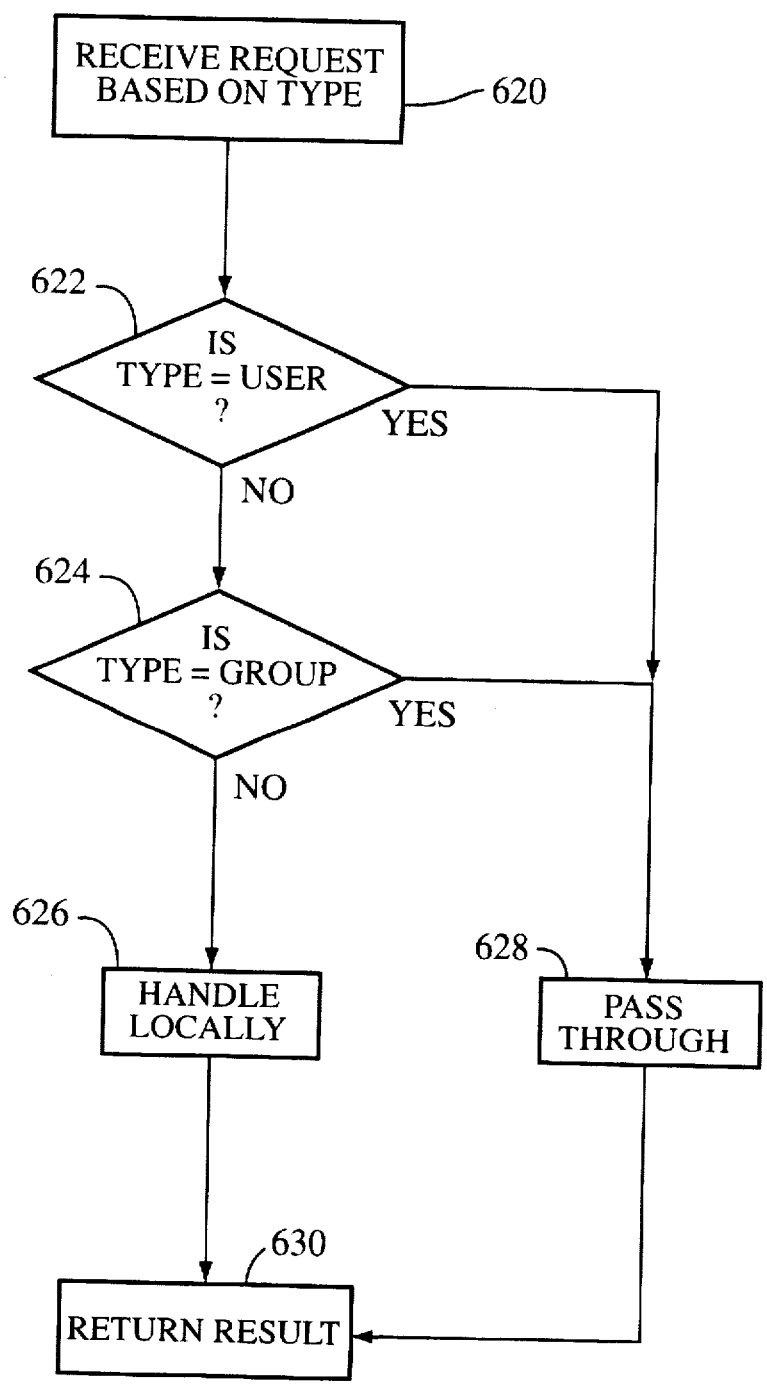
FIG. 10 represents a flow diagram illustrating the general steps taken when a service request based on an object type is received at the network server.

As shown in FIG. 10 beginning at step 620, when such a request is received it is evaluated (step 622) to determine if the object type=1, which always represents a user. If so, the request is forwarded to the authenticating agent 26 (step 628), and the result returned to the user. If the object type is not a user, at step 624 the object type it again evaluated (step 624) to determine if the object type=2, which represents a group. If so, the request is forwarded to the authenticating agent 26 (step 628), and the result returned to the user.

If the object type is not a group, then it is checked against the local database 24$_b$ at step 626. If such an object exists in this database 24$_b$, at step 628, the result, along with the corresponding information (e.g., the object ID) is returned as a success, otherwise it is returned as a failure.

While this is handled in a relatively straightforward manner when an object name and object type are fully specified, the process is complicated with scan requests seeking the next object in the database when wildcard characters are included as the object type. By way of example, the Scan Bindery Object ID request ordinarily provides the last object ID returned, along with the type and name of the object, in order to get the next object ID of the same type (and name) in the bindery. The first time the request is made, the last object ID field is set to FFFFFFFFh, to indicate a request seeking the first object ID.

In the event that a wildcard is given as the type (the wildcard for object types equals FFFFh), the network server 24 does not necessarily know whether to query its local database 24$_b$ or the authenticating agent's database 26$_b$. Moreover, if the network server 24 passed this request through to the authenticating agent 26 as a wildcard request, it would often receive in reply object IDs that are not user or group type objects. Wildcards in the object name increase the likelihood of matches of the wrong type being found. This presents a problem, as it is not efficient to sort through the objects returned in the response packet or packets to eliminate those of the incorrect type.

Figure 11:
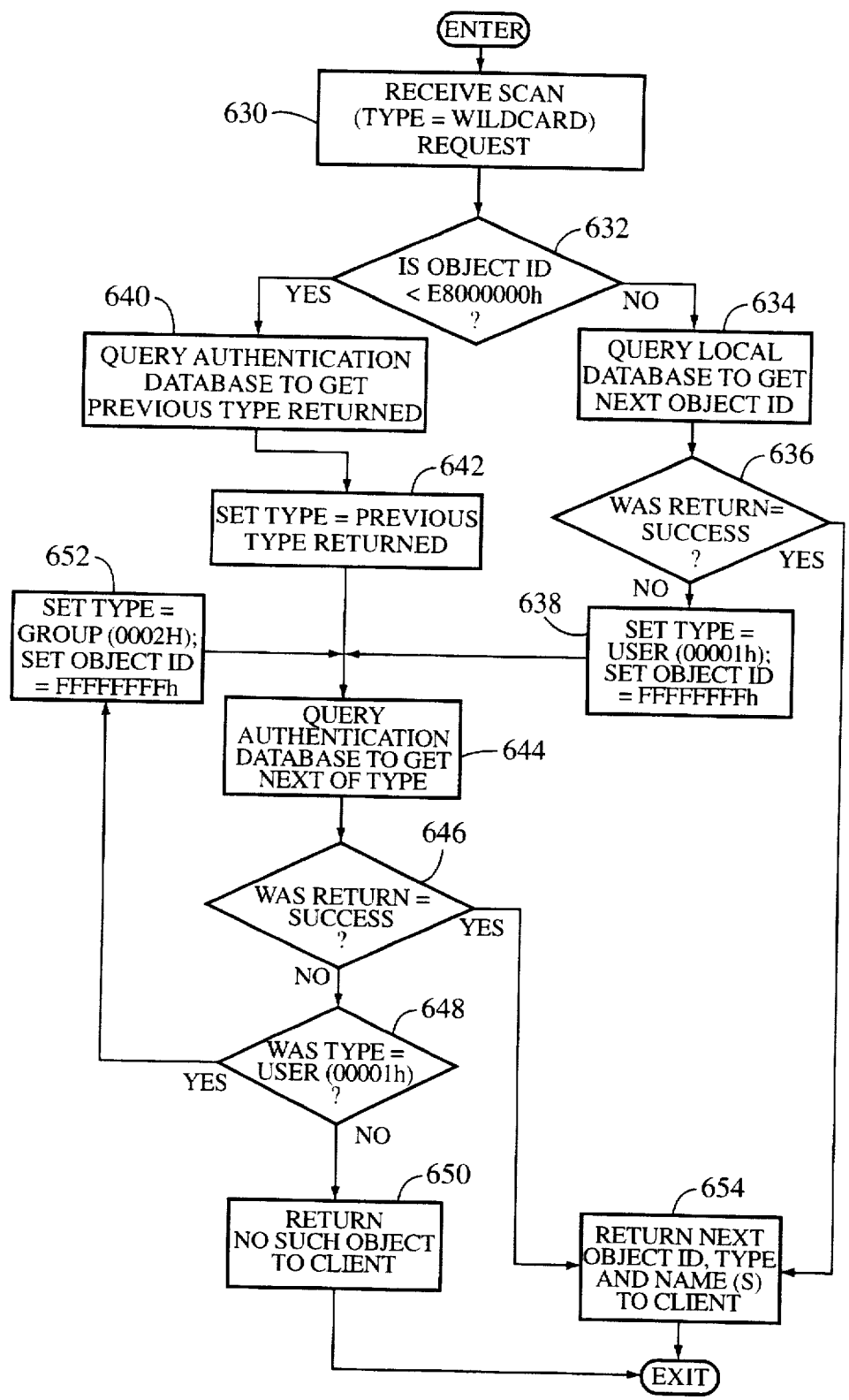
FIG. 11 represents a flow diagram illustrating the general steps taken when a scan request based on an wildcard type is received at the network server.
Figure 12:
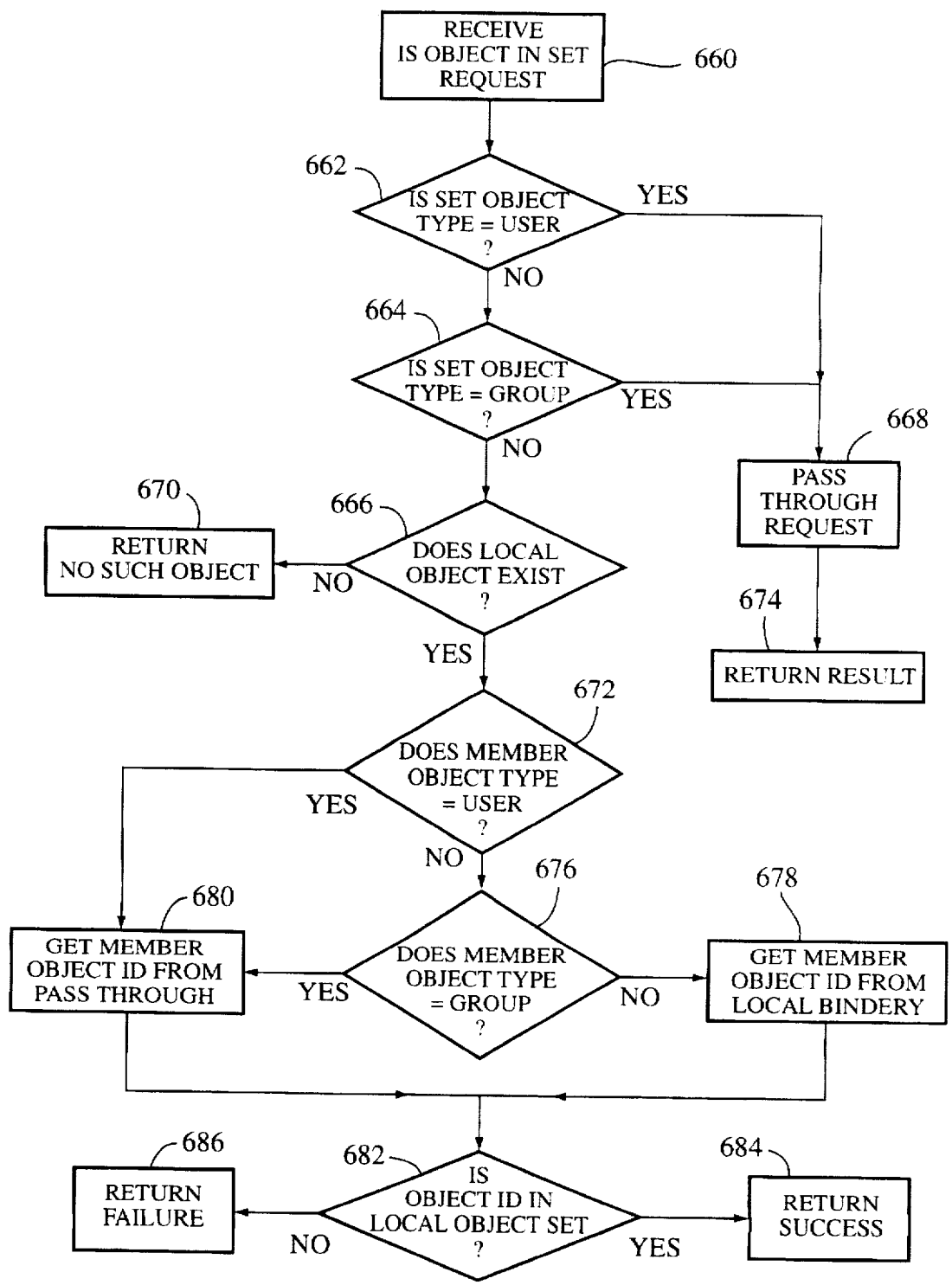
FIG. 12 represents a flow diagram illustrating the general steps taken when an "Is Object In Set" service request is received at the network server.

According to one aspect of the present invention, to solve this problem the network server 24 splits the request into both local and pass-through requests in order to emulate a server having a complete bindery. FIG. 11 illustrates the process in more detail.

First, the network server 24 determines if the next object type is likely to be in its database 24$_b$ by comparing the previous object ID supplied by the requesting client with E8000000h (step 630). If the object is greater than or equal to this value, (or equals FFFFFFFFh seeking the first entry), the network server 24 queries its own database 24$_b$ at step 634 seeking the next entry. Note that the software that queries the local database 24$_b$ must be able to handle wildcards which may be present in the user name. At step 636, the result of the query is evaluated, and if the result indicates that the next entry was successfully found, the next object ID, along with the object type and object name, is returned to the client at step 654.

If the return was not successful, and if the errorcode indicated NO SUCH OBJECT, then there is not a next object ID for that type because the previous object ID was the last object ID in the list. For simplicity, it is assumed herein that the only return codes are either SUCCESS or NO SUCH OBJECT, although other errorcodes (e.g., FFh to indicate a bindery failure) may be returned, and if so, will be sent to the user.

If the result was NO SUCH OBJECT, then the network server 24 replaces the type wildcard with a 0001h and the object ID to FFFFFFFFh at step 638. Subsequently the network server 24 sends the request to the authenticating agent 26 at step 644, as described in more detail below, to obtain the first user object ID.

Returning to the situation where the object ID was determined to be less than E8000000h at step 632, the network server has no idea whether the previous object ID was a user (type=0001h) or a group (type=0002h). Consequently, to solve this problem, the network server 24 must first find out the last object's type by querying the authenticating agent's database 26$_b$ at step 640.

Once the last object's type is has been returned, the wildcard (FFFFH) in the type field is replaced with the returned value, either a 0001h (user) or 0002h (group), at step 642. At step 644, the remote database 26$_b$ is queried to obtain the next object ID by passing the Scan Bindery Object ID request to the authenticating agent 26. Note that since scan requests are often sent iteratively, it is potentially useful to temporarily maintain the returned (next) object ID in a buffer. If that same ID comes back in the next request as the last ID, the type may be determined with a simple compare procedure rather than by sending two requests.

At step 646 the result of the remote query is evaluated. If it was successful, at step 654 the next object ID, along with the object type and object name, is returned to the client at step 654. However, if instead of receiving the next object ID a NO SUCH OBJECT errorcode (0FCh) is received, then there are no more entries for that type of object. As can be appreciated, the next entry will be a group (0002h) if the previous last entry was a user (0001h), or else NO SUCH OBJECT will be returned to the client at step 650.

Consequently, at step 648 the type is evaluated, and if the object type was a user, at step 648 the network server 24 converts the request to a request for the first object ID (FFFFFFFFh) that is a group type (0002h). The process then branches back to step 644 to query the authentication database 26$_b$ in order to retrieve the first group.

One other routine that the server handles is the Is Object In Set request. This request passes in a set object type, a set object name, the property name of the set, the member object type and the member object name, and is for the purpose of determining if a bindery object is a member of a set property.

By way of example, to see if "accounting" is part of "Joe's" group, the user would send:

1, Joe, GROUPS_I'M_IN, 2, accounting (set type user, set object name, property name of set, group member type, member object name).
Alternatively, to see if Joe is in the accounting group, the user would send:

2, accounting, MEMBER_OBJECTS, 1, JOE

FIG. 11 shows how the Is Object In Set request is handled, beginning at step 660 where the request is received. If it is a user (step 662) or a group (step 664), then the request is passed through to the authenticating agent at step 668, because the authenticating agent 26 possesses the necessary information about the user sets and group sets to compare the member with. Whatever result the authenticating agent 26 returns is passed back to the user.

However, if the set object type is neither a user or a group, then at step 666 the local database 24$_b$ is queried by the name of the object to determine if the object exists. If it does not, then 0FCh, no such object, is returned as an errorcode at step 670.

If the set object is found, then the member object type is evaluated to determine where the member object is located, so that the member can be corresponded to the set. Thus, if the member type is a user (step 672) or a group (step 676), then the corresponding member object ID is obtained by passing a request to the authenticating agent 26 (step 680). If not, then the member object ID is obtained locally (step 678).

In either case, at step 682 the member object ID is then compared against the local object set to determine if it is in that set. If not, a failure (EAh, no such member) is returned at step 686. If it is found, success (00h) is returned at step 684.

Finally, another advantage of the present invention is the ability to use the above-described authentication mechanism when interfacing with other application programs using different, non-file/print sharing protocols. For example, the present invention is compatible with a Remote Procedure Call (RPC) implementation.

RPC is a communication facility for client and server processes across a network. Application programs employing RPC are capable of off-loading specified procedures for execution on remote systems. Thus, using RPC, a remote client can call the network server 24 to execute certain procedures therefor, including procedures that provide access to the server's resources. Consequently, security at the application level must be maintained for such calls.

In keeping with the present invention, the network server 24 utilizes remote pass-through authentication for handling RPC security. The source of incoming remote procedure calls is verified prior to granting access to the services of the network server 24 by initially forwarding encrypted RPC-provided credentials to the authenticating agent 26 for verification. After the initial verification, the RPC application running on the network server 24 can perform access checking using the verified credentials. Security for RPC applications is thus handled in a manner similar to security for resource access requests from application programs executing on logged-in client systems.

As can be seen from the foregoing detailed description, the present invention provides a method and system for inserting a secured server into an existing network, wherein the inserted server does not maintain a database of the authentication information therein. The method and system enables users to access any of a plurality of secured devices with a common set of credentials, and the network network security system is able to be administrated through the maintenance of a single database in one of the network devices. There is no need to maintain multiple copies of the database. The method and system is compatible with currently existing networks, in particular, Novell® NetWare®-based networks.

What is claimed is:

1. In a computer network system, a method of authenticating a user at a client workstation for access to a network server comprising the steps of:

connecting as separate nodes on a common communications link an at least one client workstation, a network server and an authenticating agent;

logging in by the network server as a user connection to the authenticating agent, which includes a database of valid client credentials;

receiving a request at the network server for access thereto from the client workstation, the request including authentication credentials of the user;

verifying the request by passing the credentials of the user through the network server to the authenticating agent by modifying the form of the request from a request for access to a request for authentication verification;

receiving a response from the authenticating agent at the network server, the response including information indicative of the validity or invalidity of the credentials;

granting the user access to the network server when the response indicates the request contained valid credentials of the user, and;

logging off by the network server as a user connection to the authenticating agent when the connection has not been in use for a pre-defined duration of time.

2. The method of claim 1 further comprising the step of the network server authenticating a plurality of users by connecting to the authenticating agent through a single connection of the communications link.

3. The method of claim 1 wherein the step of logging into the authenticating agent includes the step of sharing an existing connection of the common communications link from the network server to the authenticating agent when a user of the network server is already logged into the authenticating agent.

4. The method of claim 1 wherein the step of the network server's logging into the authenticating agent includes the step of creating the network server's own connection when a connection to the authenticating agent is not present.

5. The method of claim 1 wherein the authentication credentials includes the user ID and an encrypted password.

6. The method of claim 1 further comprising the step of denying the user access to the network server when the response indicates the request contained invalid credentials.

7. The method of claim 1 further comprising the step of returning the response from the network server to the client workstation.

8. The method of claim 1 wherein the modification of the form of a request for access, the request being formatted in a data packet having a destination address of the network server therein, includes the steps of:

modifying the data packet to change the destination address from that of the network server to that of the authenticating agent, and transmitting the modified data packet on the communications link to the authenticating agent.

9. In a computer network system having at least one client workstation and one authenticating agent as separate nodes on a communications link, a method of adding a network server to the network for secured access by the client workstation, wherein the added server does not possess a database of authentication credentials, comprising the steps of:

adding the network server as a separate node on the common communications link without modifying existing software maintained by either the client workstation or the authenticating agent;

logging the network server into the authenticating agent as a client of the authenticating agent;

providing an authentication mechanism to users desiring access to the added network server, the authenticating mechanism having the ability to modify the request for access into a request for verification of credentials, and to verify the credentials of the client workstation with the credentials maintained by the authenticating agent;

providing database services to the client workstation from the added network server by receiving, at the server, database requests from the client workstation, selectively passing to the authenticating agent those requests requiring database information maintained by the authenticating agent, and returning information from the authenticating agent to the client workstation and;

logging the server off of the authenticating agent after a selected period of inactivity.

10. The method of claim 9 further comprising the step of authenticating by the network server a plurality of the users using a single connection to the authenticating agent.

11. The method of claim 9 further comprising the step of one or more of the users logging into the authenticating agent by an existing connection to the authenticating agent through the common communications link when another one or more of the users of the network server are already logged into the authenticating agent.

12. The method of claim 9 further comprising the step of one or more of the users logging into the authenticating agent by creating the network server's own connection through the common communications link when a connection to the authenticating agent is not present.

13. The method of claim 9 wherein the authentication credentials includes the user ID and an encrypted password.

14. The method of claim 9 wherein at least those requests requiring database information maintained by the authenticating agent are formatted in data packets, each having a destination address of the network server therein, and the step of selectively passing requests to the authenticating agent includes the steps of:

1) modifying the data packet to change the destination address from that of the network server to that of the authenticating agent, and 2) transmitting the modified data packet on the common communications link to the authenticating agent.

* * * * *